(12) United States Patent
Asai et al.

(10) Patent No.: US 8,412,737 B2
(45) Date of Patent: Apr. 2, 2013

(54) SEMI-STRUCTURED DATA RETRIEVAL METHOD, AND STRUCTURED DATE RETRIEVAL DEVICE

(75) Inventors: Tatsuya Asai, Kawasaki (JP); Shinichiro Tago, Kawasaki (JP); Seishi Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 214 days.

(21) Appl. No.: 12/720,656

(22) Filed: Mar. 9, 2010

(65) Prior Publication Data
US 2010/0235385 A1  Sep. 16, 2010

(30) Foreign Application Priority Data
Mar. 10, 2009  (JP) .................................. 2009-57174

(51) Int. Cl.
*G06F 17/30* (2006.01)
(52) U.S. Cl. ........................ 707/778; 707/769
(58) Field of Classification Search .................. 707/769, 707/778
See application file for complete search history.

(56) References Cited

U.S. PATENT DOCUMENTS

| | | | |
|---|---|---|---|
| 2004/0073541 A1* | 4/2004 | Lindblad et al. .................. 707/2 |
| 2005/0203957 A1* | 9/2005 | Wang et al. ................ 707/104.1 |
| 2007/0198559 A1* | 8/2007 | Hattori .......................... 707/101 |

FOREIGN PATENT DOCUMENTS

JP  2003-196275 A  7/2003

OTHER PUBLICATIONS

<oXygen/>, "XML Editor for XML Development: The Complete XML Development Platform with Support for all Major XML Related Standards,"<oXygen/> XML Editor, http://www.oxygenxml.com/xml_editor.html, accessed Oct. 21, 2009.

* cited by examiner

*Primary Examiner* — Khanh Pham
(74) *Attorney, Agent, or Firm* — Fujitsu Patent Center

(57) ABSTRACT

A retrieval device, from semi-structured data formed by item elements and value elements, creates aggregated structure information from the semi-structured data by aggregating the plurality of child item elements having the same name and directly connected to parent item elements having the same name, into one child item element. The device receives a retrieval request with an output condition and a constraint condition specified on the aggregate structure information. The device determines whether or not a plurality of query are created according to the retrieval request by checking a branch point at the common item elements between the output condition and the constraint condition in the aggregated structured information. And the device outputs a re-aggregate structure information corresponded to the query showing the branch point which is not expressed in the aggregate structure information to the display device.

13 Claims, 31 Drawing Sheets

FIG. 1

```
XML DATA

<Syain>SIGMA SENTAI NAKAHARAGER
  <ACT>
    <id>1</id>
    <chara>
      <name>SIGMA RED</name>
    </chara>
    <cast>
      <name>TATSUYA ASAI</name>
    </cast>
  </ACT>
  <ACT>
    <id>2</id>
    <chara>
      <name>SIGMA BLUE</name>
    </chara>
    <cast>
      <name>SHINICHIRO TAGO</name>
    </cast>
  </ACT>
  <ACT>
    <id>3</id>
    <cast>
      <name>MASAHIKO NAGATA</name>
    </cast>
  </ACT>
</Syain>
```

FIG. 8
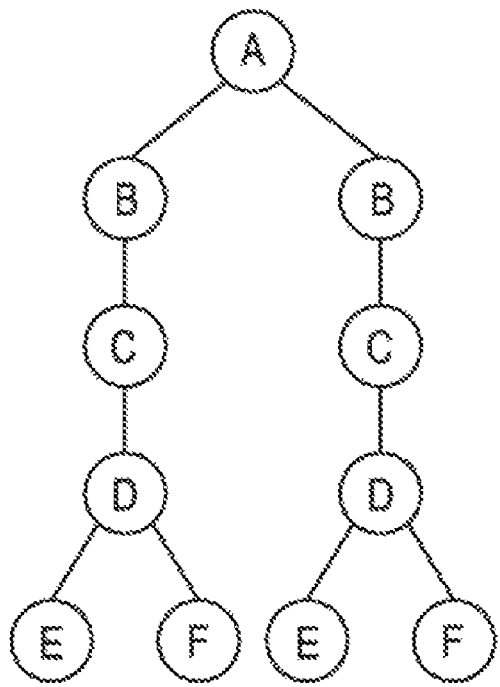
XML DATA (TREE STRUCTURE)
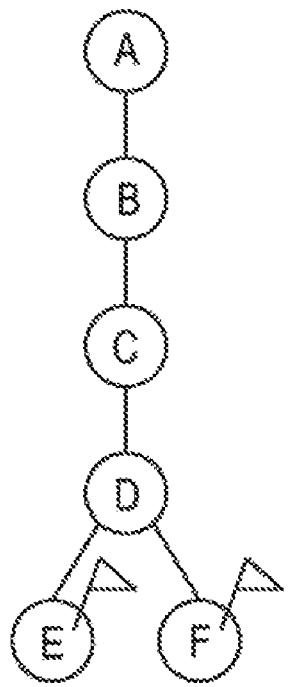
PATH TRIE (Q4) /Syain[ACT/chara/name="SIGMA BLUE"]/ACT/cast/name (Q3) /Syain/ACT[chara/name="SIGMA BLUE"]/cast/name

FIG. 16

| TYPE | ABSOLUTE PATH | OPERATOR | VALUE |
|---|---|---|---|
| OUTPUT | /Syain/ACT/cast/name | | |
| CONSTRAINT | /Syain/ACT/chara/name | = | SIGMA BLUE |
| BRANCH | /Syain/ACT | | |
| BRANCH | /Syain | | |
| ... | ... | ... | ... |

140c

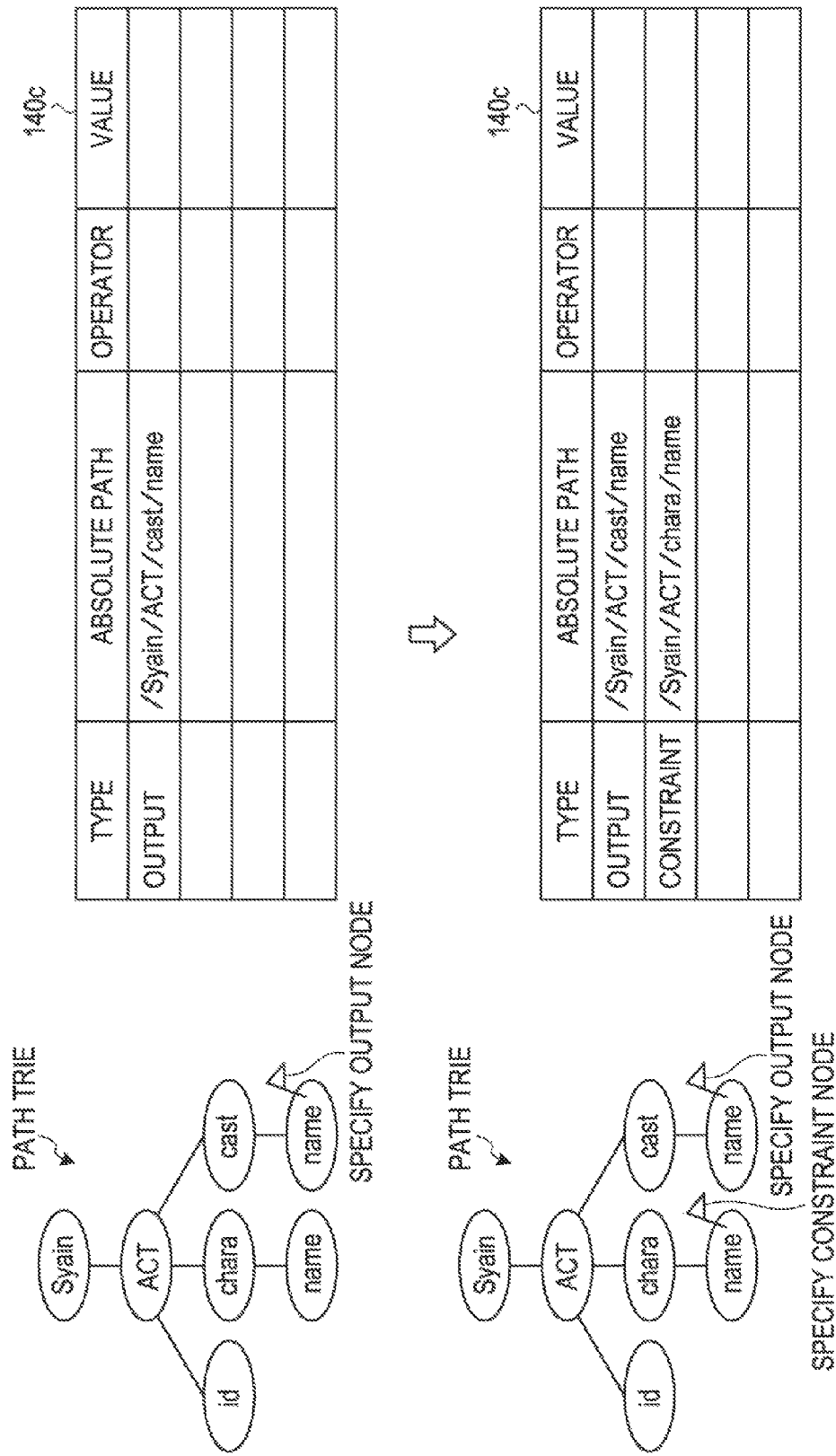

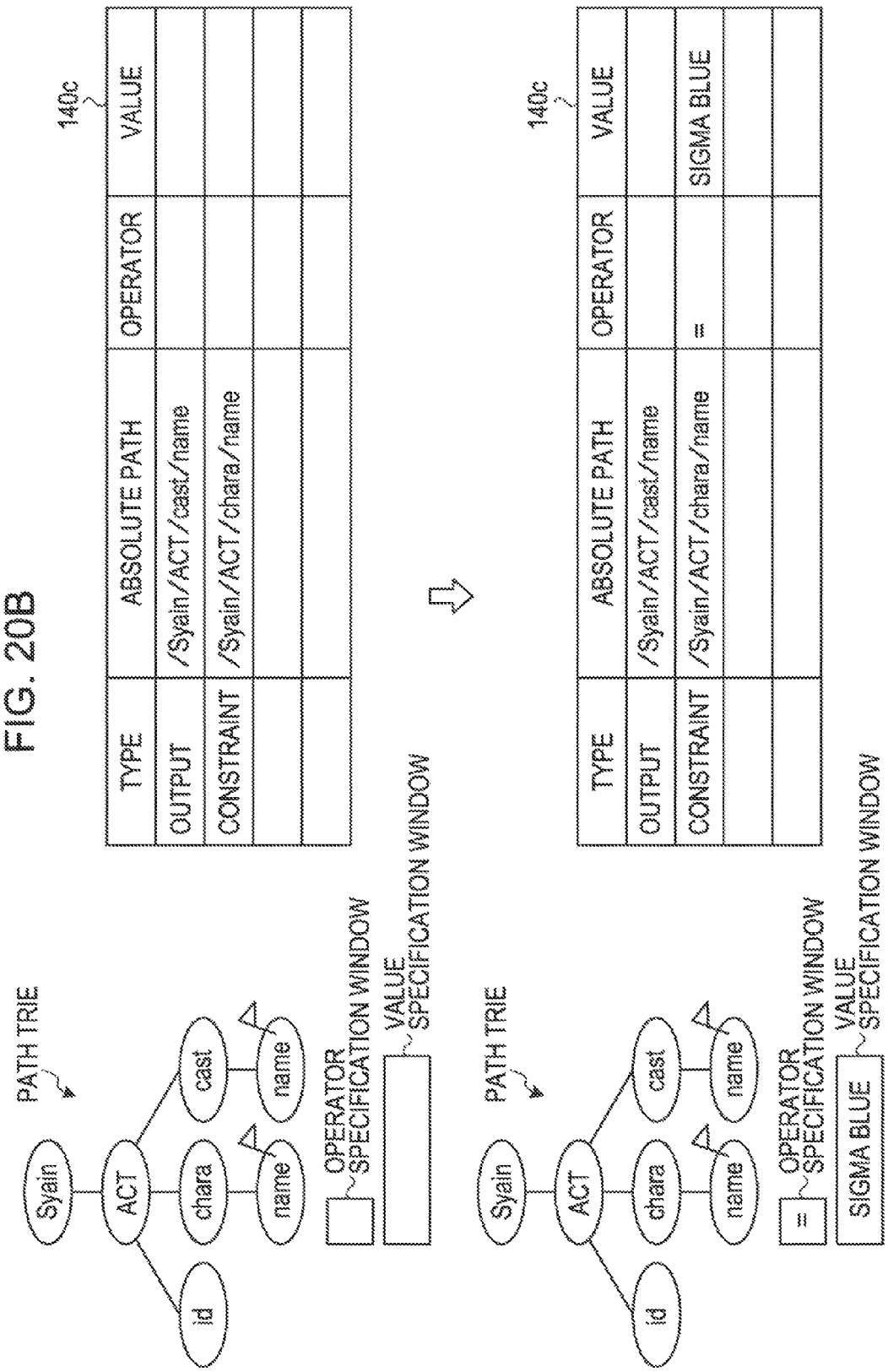

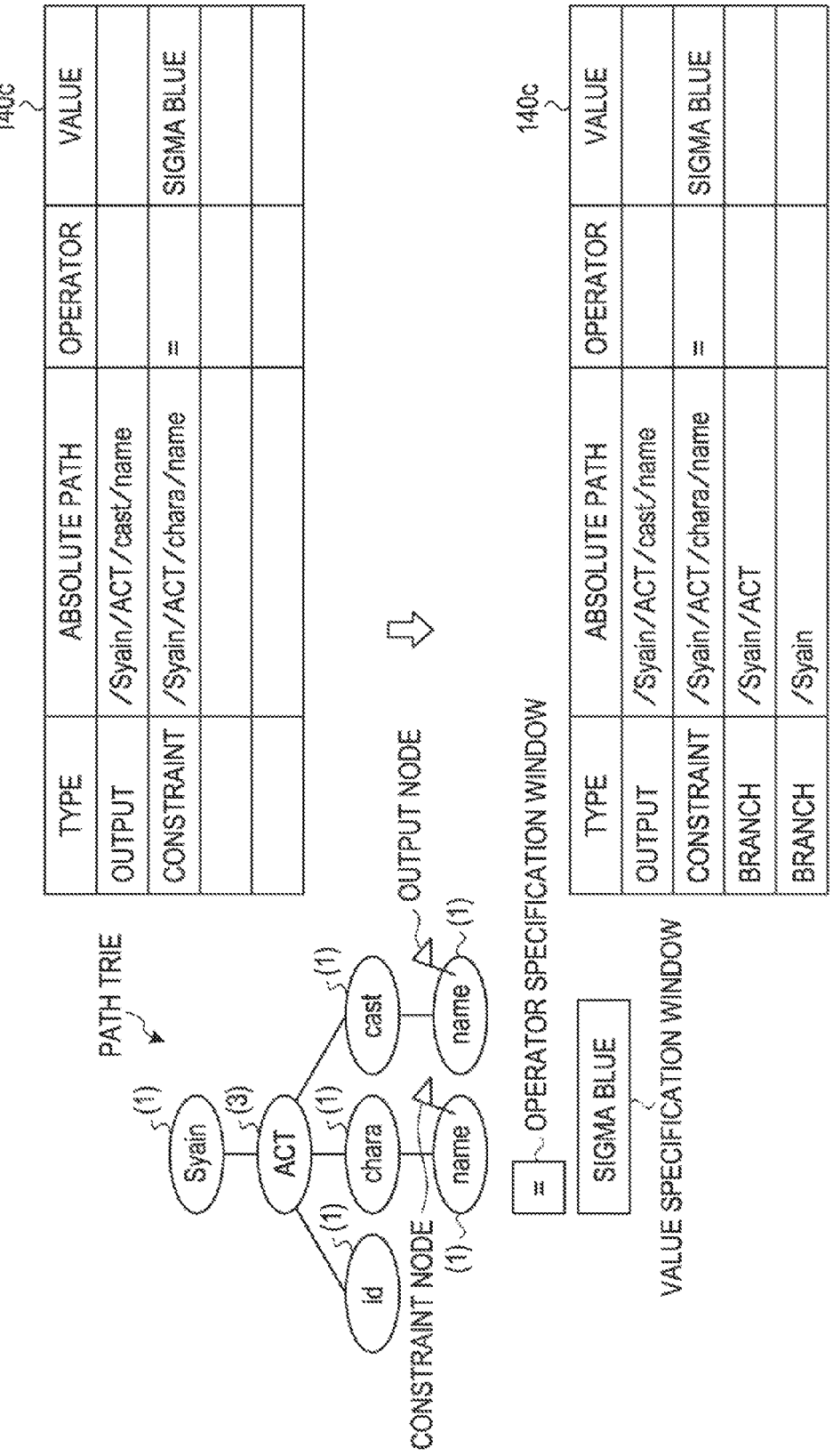

FIG. 23
(Q3) /Syain/ACT[chara/name="SIGMA BLUE"]/cast/name
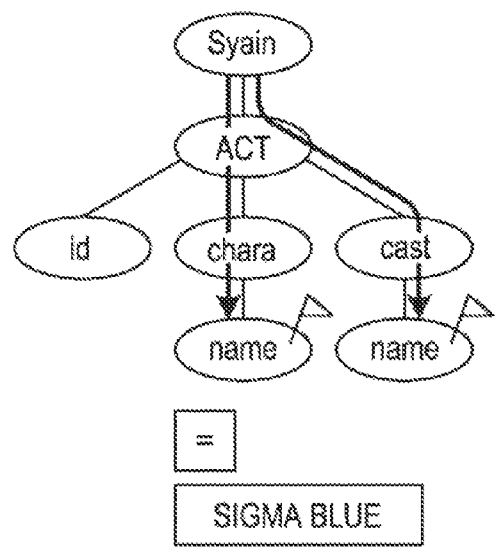
(Q4) /Syain[ACT/chara/name="SIGMA BLUE"]/ACT/cast/name
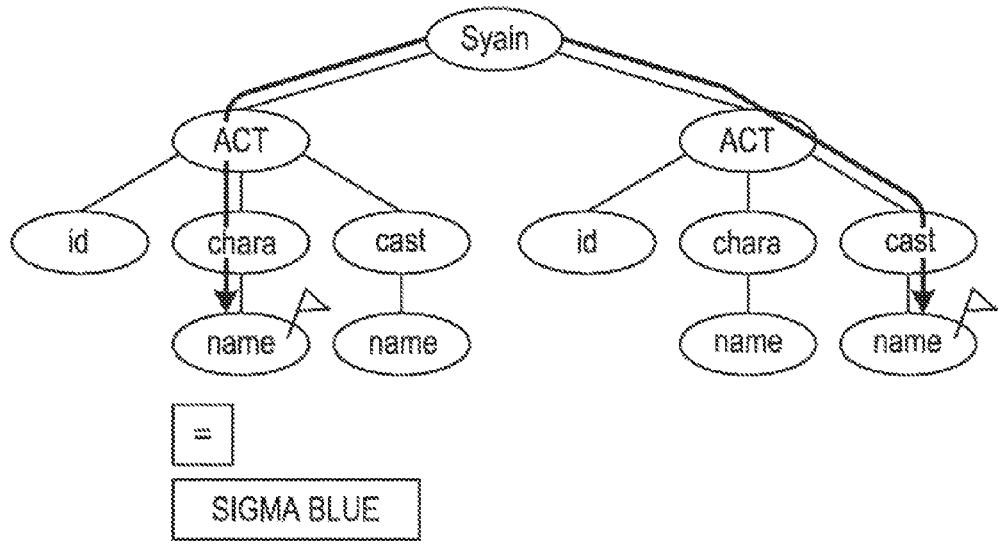

SEMI-STRUCTURED DATA RETRIEVAL METHOD, AND STRUCTURED DATE RETRIEVAL DEVICE

CROSS-REFERENCE TO RELATED APPLICATIONS

This application is based upon and claims the benefit of priority of the prior Japanese Patent Application No. 2009-57174, filed on Mar. 10, 2009, the entire contents of which are incorporated herein by reference.

FIELD

Embodiments described herein relate to a retrieval device and a retrieval method for retrieving data from structured data or semi-structured data, and a storage medium storing a retrieval program.

BACKGROUND

In recent years, markup languages such as XML (Extensible Markup Language) have been used as document data processed by a computer. The XML can make it easy to share, via communication network, a structured document and structured data between different information systems, and thus has been increasingly used by computers. Hierarchically structured document data described on the basis of the XML will be hereinafter described as XML data.

Further, an XPath (XML Path Language) query is used to detect desired data from the XML data. The XPath query is a standard query language for the XML data, and is capable of describing a conditional expression for a complicated XML tree structure. In the following description, the XPath query will be simply described as the query.

As described in Japanese Unexamined Patent Application Publication No. 2003-196275, in the field of word processors or like, a user can input a retrieval condition in a natural language to retrieve data. However, to retrieve data from the XML data, it is necessary to specify a query by using a conditional expression. Without special knowledge about the query, the user is unable to easily retrieve data from the XML data.

To specify a query, XML editing software <oXygen/>® provided by SyncRO Soft Ltd. provides a technique of displaying, on a screen, an aggregate structure aggregating the hierarchical structure of the XML data, and automatically generating a query when the user specifies the query on the basis of the displayed aggregate structure.

A summary of the <oXygen/>® will be described. Firstly, <oXygen/>® generates an aggregate structure which aggregates the hierarchical structure of the XML data. For example, FIG. 6 illustrates an aggregate structure of the XML data illustrated in FIG. 2. In the following description, a XML data illustrated in an aggregate structure will be referred to herein as a path trie.

Then, <oXygen/>® displays the path trie on a screen to allow a user to specify an output node. The output node is the node connected to the value (text node) which is to be retrieved. In FIG. 6, if "name" connected under "cast" is specified as the output node by the user, the respective nodes from the root node "Syain" to the specified node "name" are sequentially added to the conditional expression of the query. Thereby, a query "Q=/Syain/ACT/cast/name" is created.

SUMMARY

According to an aspect of the embodiments, a retrieval device includes a creating unit which creates aggregate structure information from the semi-structured data by aggregating the plurality of child item elements having the same name and directly associated with parent item elements having the same name, into one child item element. The retrieval device includes a receiving unit which receives a retrieval request with an output condition and a constraint condition specified on the aggregate structure information.

The retrieval device includes a determining unit which determines whether or not a plurality of query are created according to the retrieval request by checking a branch point at the common item elements between the output condition and the constraint condition in the aggregate structure information. And the retrieval device includes an outputting unit which outputs a re-aggregate structure information corresponded to the query showing the branch point which is not expressed in the aggregate structure information to the display device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates an example of XML data;

FIG. 8 explains branch point determination;

FIG. 16 illustrates an example of the data structure of a query generation table;

FIG. 20A explains the processing by a query specification reception unit;

FIG. 20B explains the processing by the query specification reception unit;

FIG. 21 explains the processing by a branch point determination processing unit;

FIG. 23 explains the processing by a query display processing unit;

DESCRIPTION OF EMBODIMENTS

As described above in the background section of this application, displaying the aggregate structure on the screen is an intuitive and easy way for the user to specify the retrieval condition of the query. However, with the method described in the background section, the user may not be able to specify a constraint condition.

Upon considering the art noted in the background section, the inventors pondered consequences associated with not permitting a user to easily identify a constraint condition. Accordingly, embodiments described herein provide a storage medium, a retrieval method, and a retrieval device supporting the creation of a complicated query containing a constraint condition, while maintaining an intuitive nature.

With reference to the accompanying drawings, embodiments of a storage medium, a retrieval method, and a retrieval device according to embodiments of the present invention will be described in detail below. The present invention is not limited by the embodiments.

Figure 2:
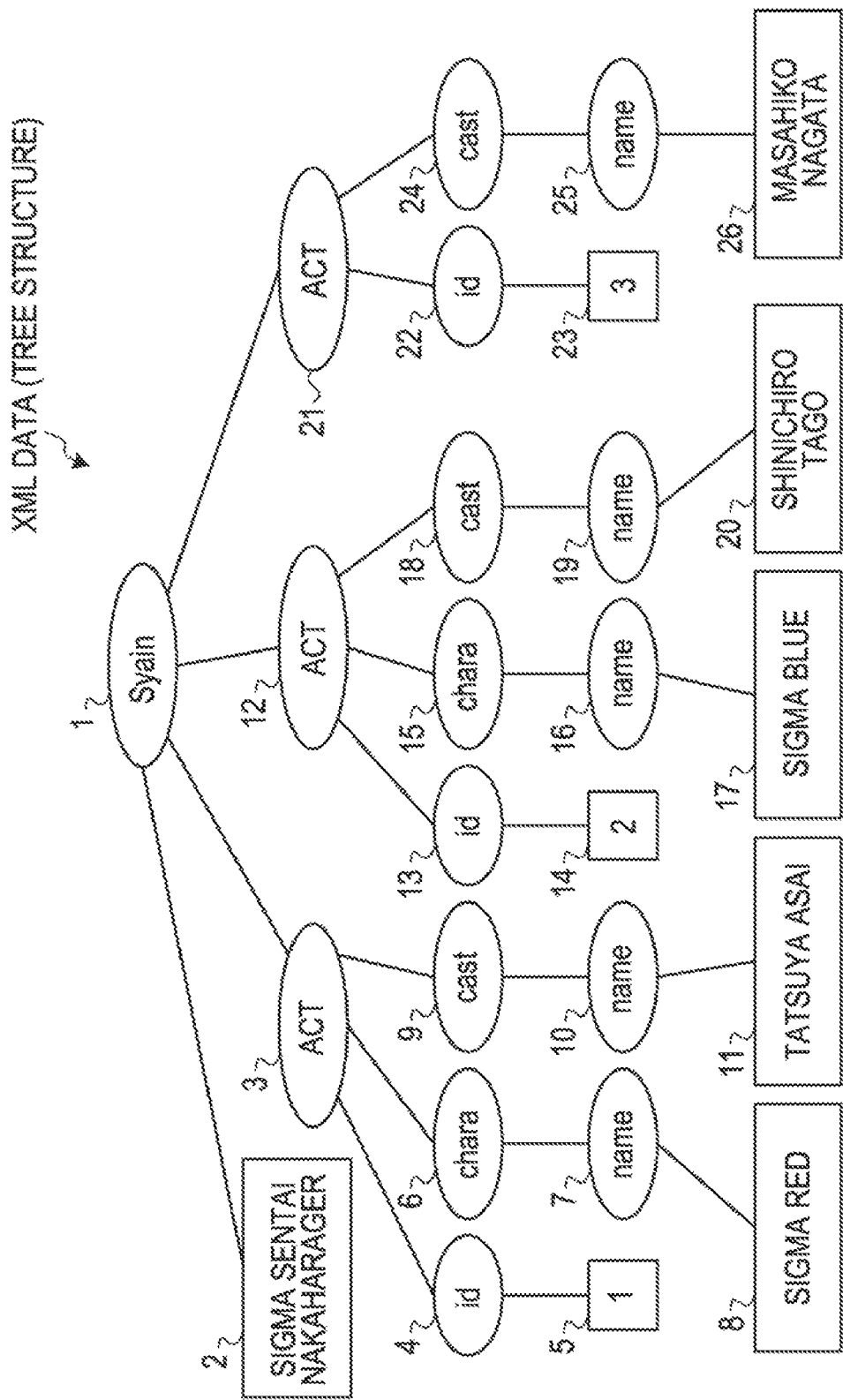
FIG. 2 illustrates an example of tree expression of the XML data.

Extensible Markup Language (XML) data used in the present embodiments will be first described. FIG. 1 illustrates an example of the XML data. The XML data has a hierarchical structure in which elements are divided by element identifiers such as "<" and "</". The XML data in FIG. 1 can be expressed as a tree structure FIG. 2 illustrates an example of the tree structure of the XML data illustrated in FIG. 1. In an XML tree structure, the XML data includes element nodes and text nodes. In FIG. 2, element nodes correspond to node IDs (Identifiers) 1, 3, 4, 6, 7, 9, 10, 12, 13, 15, 16, 18, 19, 21, 22, 24 and 25. And text nodes correspond to node IDs 2, 5, 8, 11, 14, 17, 20, 23 and 26 in FIG. 2.

In the following, an element node having a node ID "n" and an element name "elem" will be described as "elem n". For example, "Syain1" represents an element node having a node ID "1" and an element name "Syain". Further, description such as "ACT3, 12, and 21" represents three element nodes (each of which has an element name ACT) having node IDs 3, 12, and 21, respectively.

In the XML data, the respective element nodes and text nodes are connected to one another. In FIG. 2, for example, the element node Syain1 is connected to the text node "SIGMA SENTAI NAKAHARAGER"2 and the element nodes ACT3, 12, and 21. In semi-structured data represented by the XML data, the relationship among items or among items and values can be expressed as a tree structure. The items correspond to the element nodes, and the values correspond to the text nodes.

Figure 3:
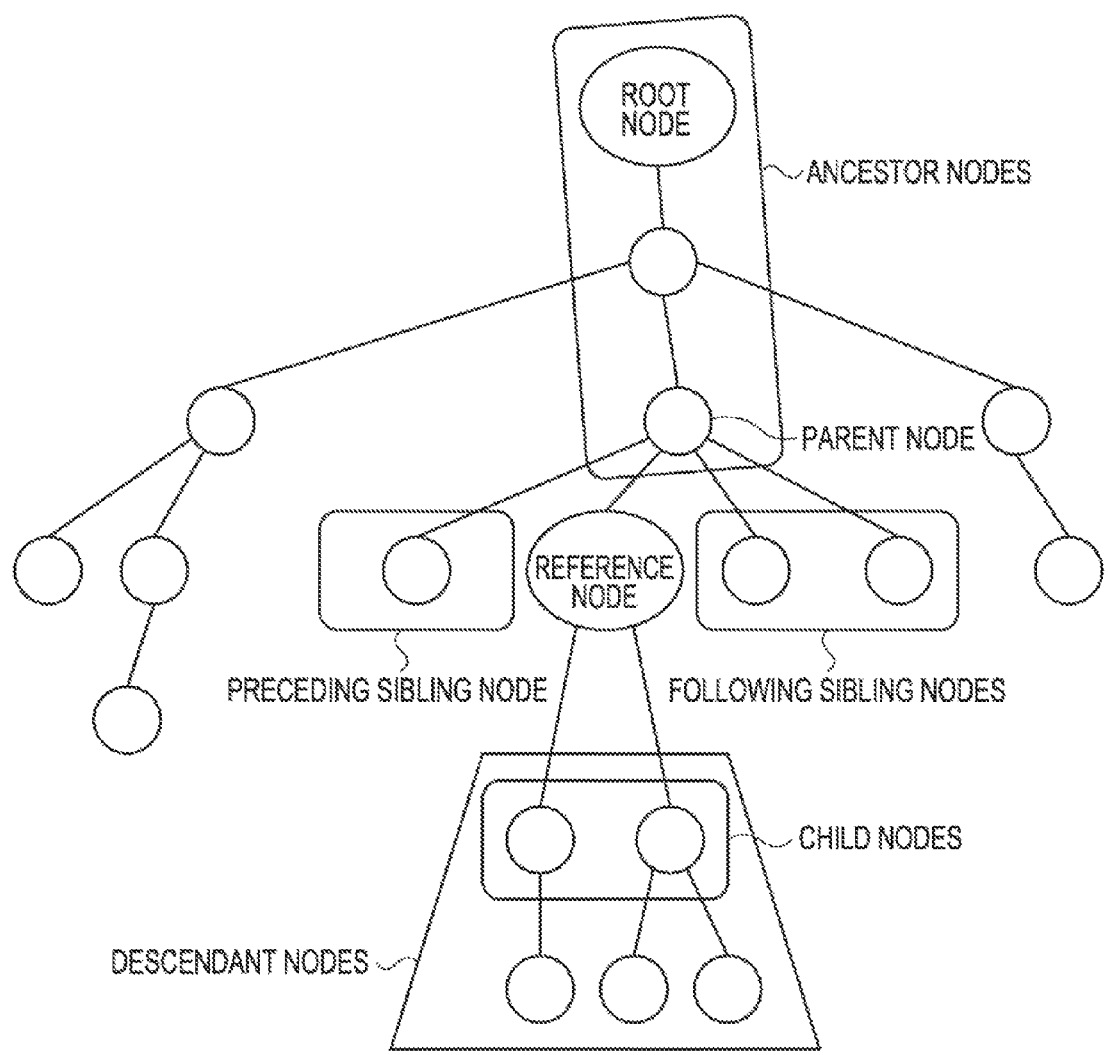
FIG. 3 illustrates node terms.

In the following, for explaining the nodes included in a XML tree structure, terms such as root node, parent node, child node, preceding sibling node, following sibling node, ancestor node, and descendant node will be used. FIG. 3 is a diagram for explaining these node terms. Root node is one of the nodes forming the tree and is located in the top layer. Further, a node located in a layer immediately above a reference node and connected to the reference node is defined as the parent node of the reference node (hereinafter referred to as the parent node). Further, a node located in a layer immediately below the reference node and connected to the reference node is defined as the child node of the reference node (hereinafter referred to as the child node).

A node located in the same layer as the reference node, connected to the same parent node as the reference node is connected, and present on the left side of the reference node is defined as the preceding sibling node of the reference node (hereinafter referred to as the preceding sibling node). A node located in the same layer as the reference node, connected to the same parent node as the reference node is connected, and present on the right side of the reference node is defined as the following sibling node of the reference node (hereinafter referred to as the following sibling node). Nodes present in the path from the root node to the parent node are collectively defined as the ancestor nodes. Nodes connected under the reference node are collectively defined as the descendant nodes.

For example, if the reference node is set to be chara15 in FIG. 2, the root node is Syain1. The parent node is ACT12. The preceding sibling node is id13. The following sibling node is cast18. The child node is name16. Also, the ancestor nodes are Syain1 and ACT12, and the descendant nodes are name16 and SIGMA BLUE17.

If a query is specified to the XML data, the data located at the position referred to by the query can be detected from the XML data. Subsets of a query based on W3C (World Wide Web Consortium) is defined as follows.

Path::="/"RPath
RPath::=Step("/"Step)*
Step::=Axis"::"Ntest("["Pred"]")*
Axis:: ="child"
Ntest::=tagname|"*"|"text( )"|"node( )"
Pred::=Expr|"not"Expr
Expr::=RPath|1_func"("RPath")"|n_func"("RPath",
"const)+")"

Herein, the relationship tagnameeTag (Tag represents a set of tag names) is assumed. Further, 1_func represents a function with one variable from a data node V to {0, 1}. Similarly, n_func represents a function with n variable where n denotes a positive integer for returning {0, 1}, wherein only a constant is input except for the first argument. The constant "const" represents an arbitrary character string or numeric value.

Figure 4:
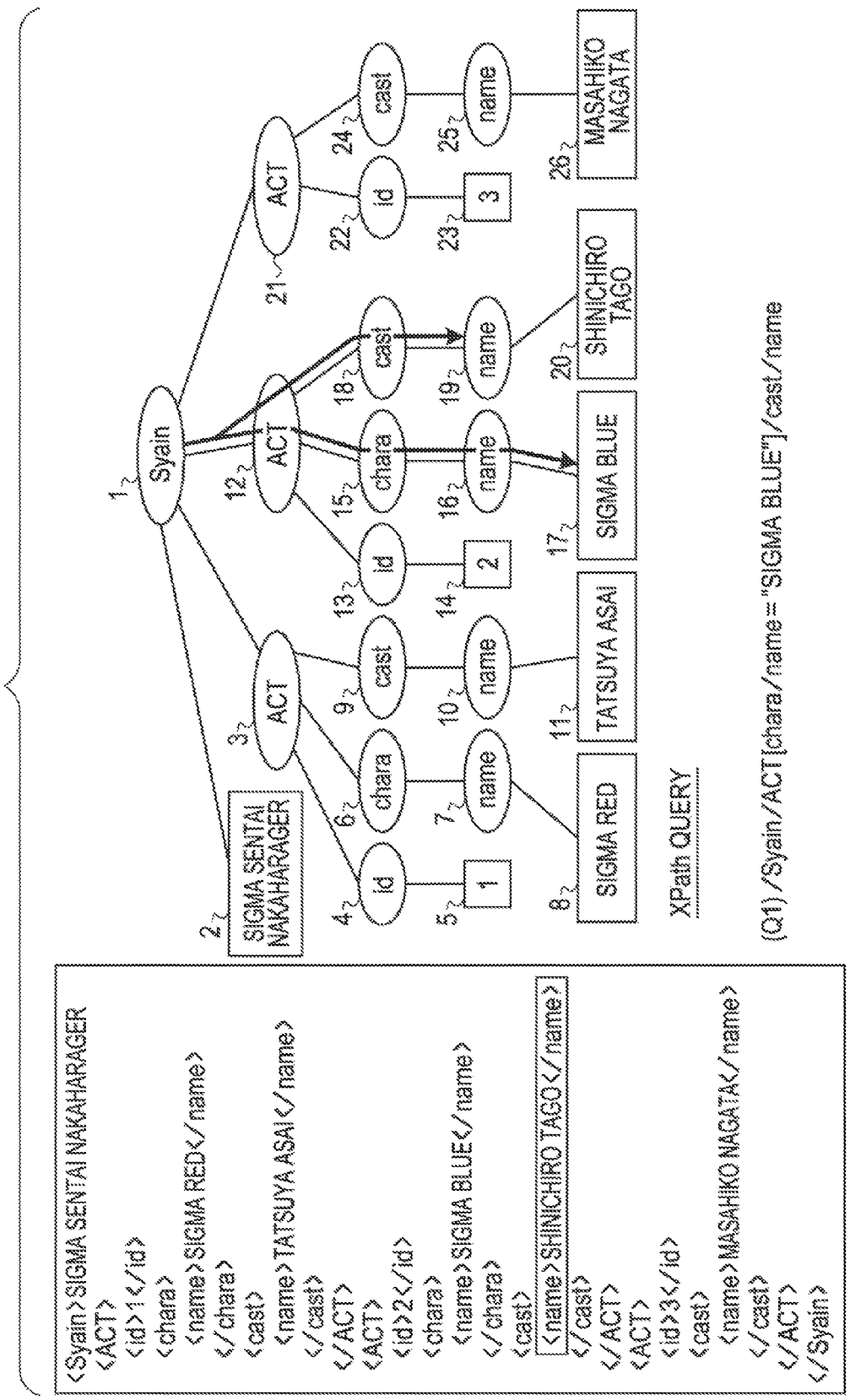
FIG. 4 explains elements on a XML tree structure specified by a first query.
Figure 5:
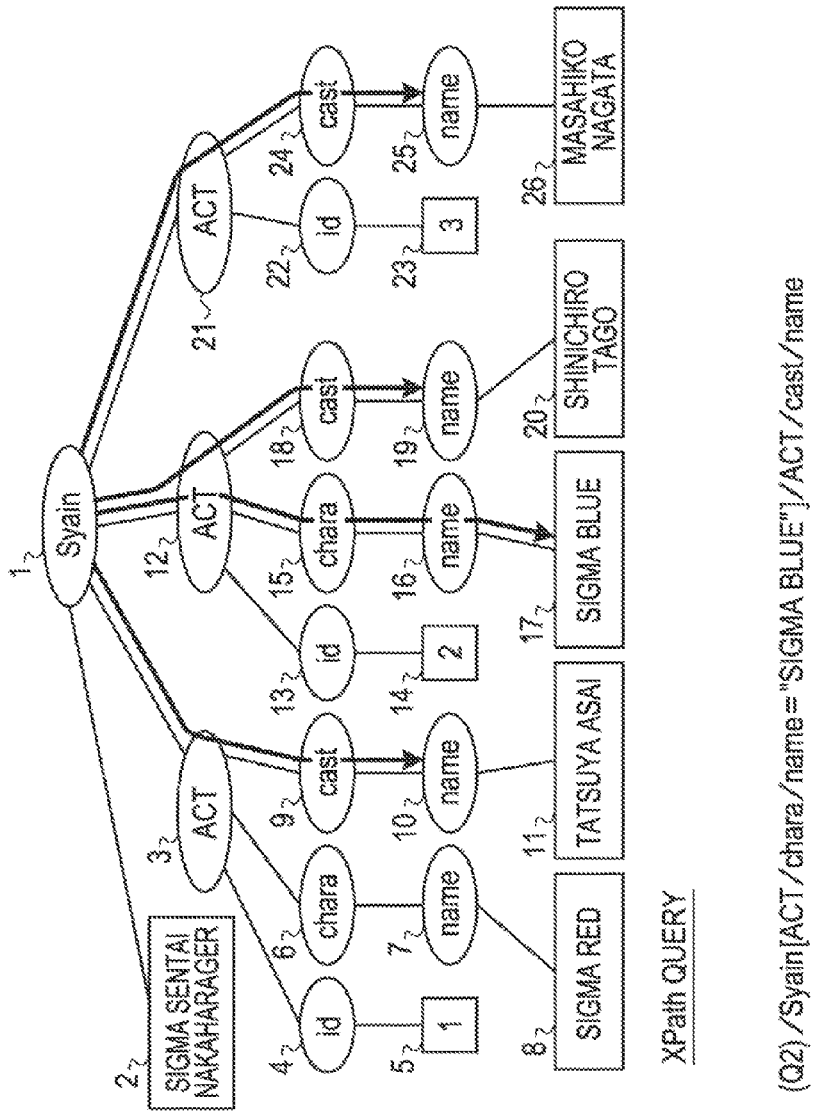
FIG. 5 explains elements on a XML tree structure specified by a second query.

FIGS. 4 and 5 explain elements on a XML tree structure specified by queries. FIG. 4 illustrates the specified elements in a case in which the query is specified as "Q1=/Syain/ACT [chara/nanne="SIGMA BLUE"]/cast/name." The query "Q1=/Syain/ACT[chara/name="SIGMA BLUE"]/cast/name" means an instruction to select and return, from the elements specified by "/Syain/ACT/cast/name," all elements of which a path "chara/name" branching at "ACT" correspond to the value "SIGMA BLUE".

In FIG. 4, therefore, the element specified by the query "Q1=/Syain/ACT[chara/name="SIGMA BLUE"]/cast/ name" is name19, and "<name>SHINICHIRO TAGO</ name>" is output as the retrieval result. In this query,[ ] represents a constraint condition. For example, "ACT[chara/ name="SIGMA BLUE"]" represents "ACT" having "chara/ name="SIGMA BLUE" thereunder. With the constraint condition added to the query, it is possible to narrow down retrieval targets in the XML data.

FIG. 5 illustrates the specified elements in a case in which the query is specified as "Q2=/Syain[ACT/chara/name="SIGMA BLUE"]/ACT/cast/name." The query "Q2=/Syain[ACT/chara/name="SIGMA BLUE"]/ACT/cast/name" means an instruction to select and return, from the elements specified by "/Syain/ACT/cast/name," all elements of which a path "ACT/chara/name" branching at "Syain" correspond to the value "SIGMA BLUE".

In FIG. 5, therefore, the elements specified by the query "Q2=/Syain[ACT/chara/name="SIGMA BLUE"]ACT/cast/name" are name10, 19, and 25, and "<name>TATSUYA ASAI</name>," "<name>SHINICHIRO TAGO</name>," and "<name>MASAHIKO NAGATA</name>" are output as the retrieval result. In the above query, [ ] represents a constraint condition. "Syain[ACT/chara/name="SIGMA BLUE"]" represents "Syain" having "ACT/chara/name="SIGMA BLUE" thereunder.

With the specification of the conditional expression of the query, it is possible to retrieve desired data from the XML data. However, for specifying a conditional expression of the query, it is necessary to combine a set of tree structures, an output node, and a constraint condition. The inventors of the instant application have, upon considering the art noted in the background section, pondered consequences associated with not permitting a user to easily identify a constraint condition.

For example, <oXygen/>® described above in the background section of this application is capable of creating only the simplest type of query having no constraint condition. That is, <oXygen/> is incapable of creating the queries Q1 and Q2 which contain the constraint conditions as described in FIGS. 4 and 5.

Figure 7:
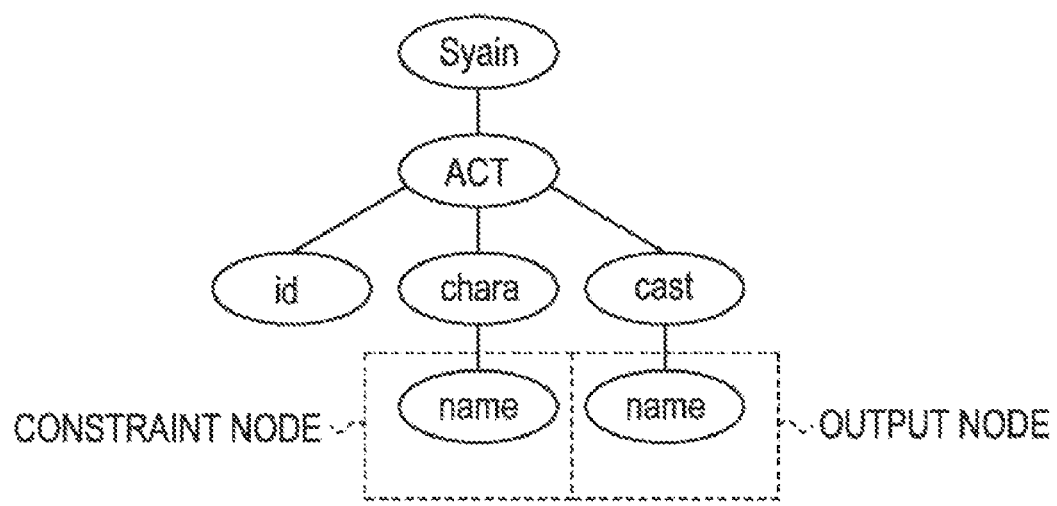
FIG. 7 illustrates an issue of a related art.

Further, FIG. 7 explains an issue of <oXygen/>® considered and recognized by the inventors of this application. In the path trie in FIG. 7, "name" connected under "cast" is specified as the output node, and "name" connected under "chara" is specified as the constraint node. However, by specifying these nodes, a plurality of queries are conceivable. One of the candidate query may be "Q3=/Syain/ACT[chara/name="SIGMA BLUE"]/cast/name", or another candidate query may be "Q4=/Syain[ACT/chara/nanne="SIGMA BLUE"]/ACT/cast/name", these queries already described above.

However, both queries Q3 and Q4 have "/Syain/ACT/cast/name" as the path from the root node to the output node, and these queries have "/Syain/ACT/chara/name" as the path from the root node to the constraint node. Therefore, it is impossible to differentiate the queries on the path trie illustrated in FIG. 7, and to determine which one of the queries is an appropriate query.

As described in FIG. 7, the queries Q3 and Q4 both indicate the same node on the path trie. However, the path trie is merely data aggregating the XML data basically for convenience sake. Therefore, if the queries Q3 and Q4 are specified in actual XML data, the queries Q3 and Q4 produce different retrieval results to be output.

If the query "Q3=/Syain/ACT[chara/nanne="SIGMA BLUE"]/cast/name" is specified to retrieve data from the XML data illustrated in FIG. 2, name19 is detected, and "<name>SHINICHIRO TAGO</name>" is returned. Meanwhile, if the query "Q4=/Syain[ACT/chara/nanne="SIGMA BLUE"]/ACT/cast/name" is specified to retrieve data from the XML data illustrated in FIG. 2, name10, 19, and 25 are detected, and "<name>TATSUYA ASAI</name>," "<name>SHINICHIRO TAGO</name>," and "<name>MASAHIKO NAGATA</name>" are returned.

As described above, even if the respective queries indicate the same node on the path trie illustrated in FIG. 7, the queries indicate different nodes in the actual XML data. Therefore, if a plurality of queries exist on the path trie, it is an important point to determine which one of the queries is an appropriate query.

To solve the above issue, if the path trie is not generated, and if the XML data as illustrated in FIG. 2 is directly displayed to allow the user to specify the output node and the constraint node, only one query is created, and thus the above-described issue can be solved. However, the actual XML data has a complicated structure. Therefore, according to the method of directly displaying the XML data to have the output node and the constraint node specified, the burden on the user is increased.

In the case in which a plurality of queries are generated on the path trie, therefore, if the XML data is not directly displayed but the minimum aggregate structure enabling differentiation among the queries is displayed as the path trie, it is possible to generate an appropriate query while reducing the burden on the user.

Herein, when the queries Q3 and Q4 are compared with each other, the "branch point" in a branching structure is different between the queries. Specifically, in the query Q3, the constraint condition is inserted immediately after "ACT," and thus the position of "ACT" corresponds to the branch point. In the query Q4, the constraint condition is inserted immediately after "Syain," and thus the position of "Syain" corresponds to the branch point. Therefore, if the queries are differentiated on the path trie with the use of the branch point, it is also possible to generate an optimal query on the path trie.

Further, if there are an n number (n represents a natural number) of branch points on the path trie, it is important to determine whether or not the branch points are present in the actual XML data. The branch points (branch point candidates) on the path trie correspond to the nodes common to the path from the root node to the output node and the path from the root node to the constraint node. The common nodes are referred to as common prefixes. FIG. 8 explains branch point determination. The left side of FIG. 8 illustrates a tree structure of XML data, and the right side of FIG. 8 illustrates a path trie corresponding to the XML data on the left side.

In the path trie of FIG. 8, when F and E represent the output node and the constraint node, respectively, the common prefixes are nodes A, B, C, and D. Therefore, the branch point candidates are the nodes A, B, C, and D. However, it is observed from the comparison between the XML data and the path trie that only the nodes A and D actually serve as the branch points. Therefore, if the actual branch points are determined among the branch point candidates present on the path trie, the queries can be differentiated on the basis of the thus determined branch points.

Figure 9:
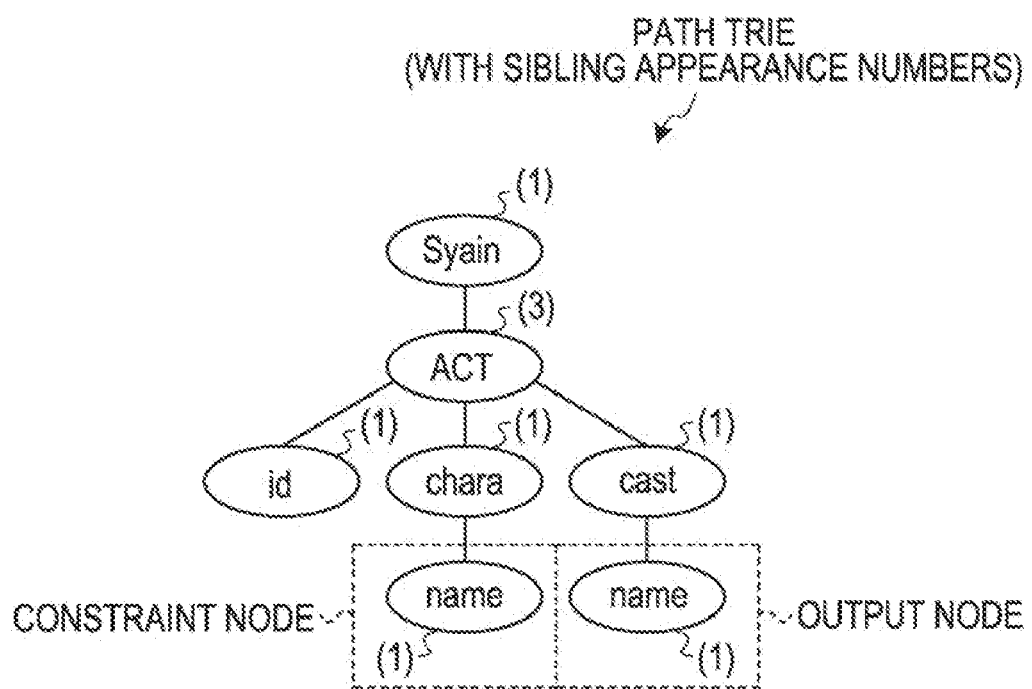
FIG. 9 illustrates a path trie with sibling occurrence numbers.

A retrieval device according to the present embodiment will be described. The retrieval device registers the maximum sibling occurrence number of each of the nodes at the construction of the path trie. FIG. 9 illustrates a path trie of the XML data illustrated in FIG. 2 with sibling occurrence numbers of each node.

According to the present embodiments, as in FIG. 9, each of the nodes in the path trie is associated with the maximum sibling occurrence number. With reference to FIG. 2, "ACT" repeatedly appears three times as a child node of "Syain", and thus has a maximum sibling occurrence number of "3." Each of the other nodes appears only once as a child node of a parent node ID, and thus has a maximum appearance number of "1."

When the output node and the constraint node are specified on the path trie, the retrieval device creates a query satisfying a specified condition. The retrieval device then determines, as the branch point candidates, the nodes included in the common prefixes of an output path and a constraint path. The output path refers to the path from the root node to the output node, and the constraint path refers to the path from the root node to the constraint node.

In FIG. 9, if the output node is set to be "name" connected under "cast," the output path is represented as "/Syain/ACT/cast/name." Further, if the constraint node is set to be "name" connected under "chara," the constraint path is represented as "/Syain/ACT/chara/name." Then, the queries satisfying the specified condition are "Q3=/Syain/ACT[chara/name="SIGMA BLUE"]/cast/name" and "Q4=/Syain[ACT/chara/name="SIGMA BLUE"]/ACT/cast/name." By comparing the output node with the constraint node, the nodes as the branch point candidates are "Syain" and "ACT."

The retrieval device determines the branch point by applying branch point discrimination rules to the branch point candidates. There are two branch point discrimination rules. The first rule is that the lowest node of the branch point candidates is determined as a branch point. The second rule is that the branch point is the branch point candidates having a child node, the child node which has maximum sibling occurrence number of two or more. In FIG. 9, the branch point candidates are "Syain" and "ACT," and the first rule applies to "ACT," and thus "ACT" is the branch point. Further, the second rule applies to "Syain," and thus "Syain" is the branch point.

Figure 10:
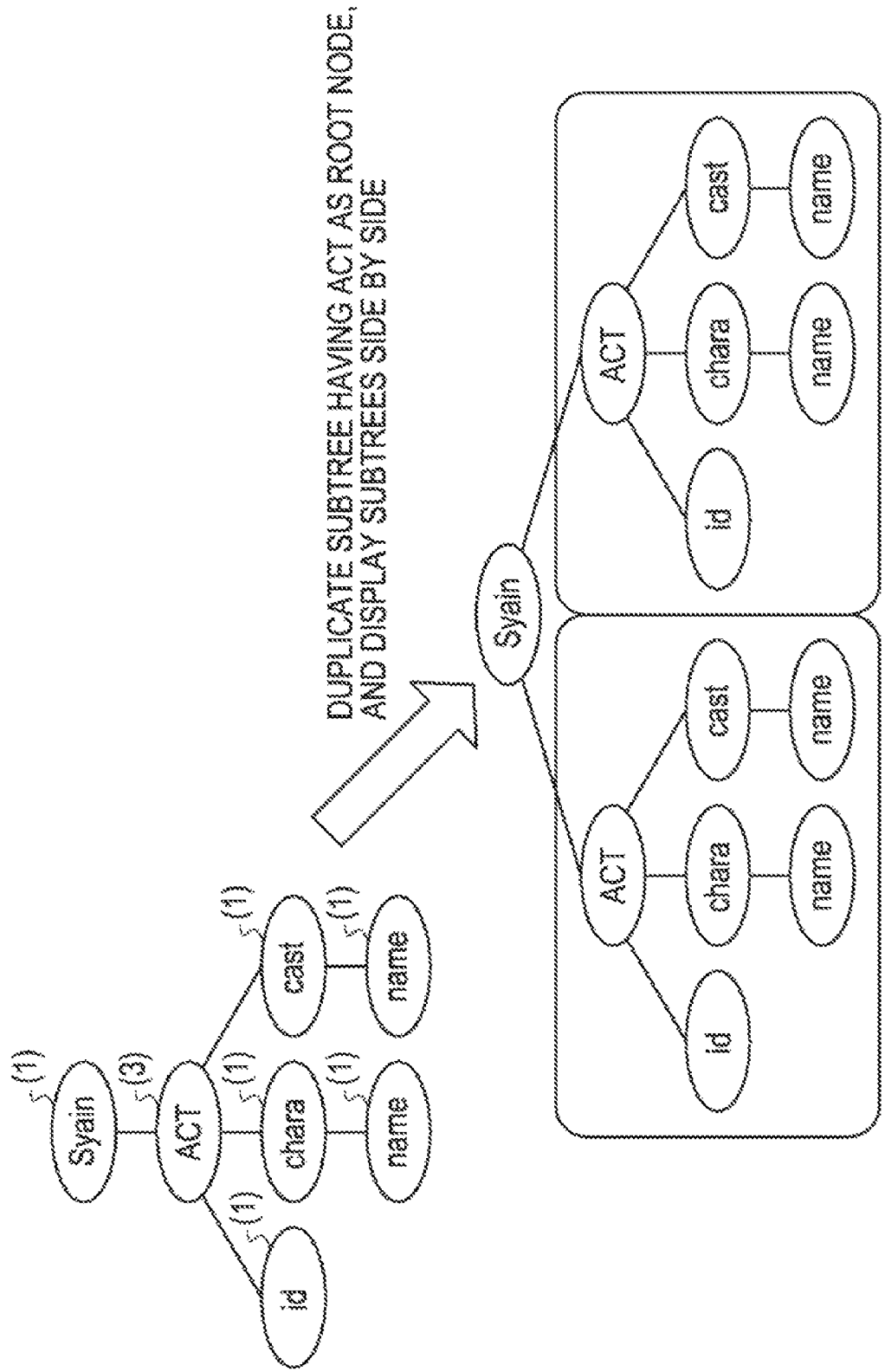
FIG. 10 illustrates an example of an expanded path trie.
Figure 11:
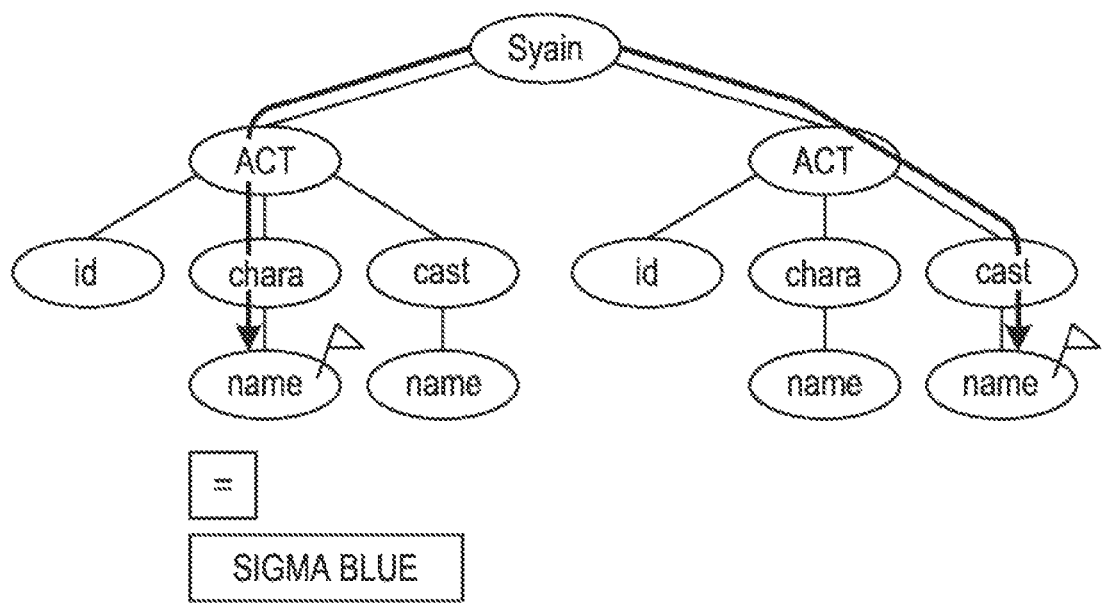
FIG. 11 illustrates a path trie specified by a fourth query.

By determining branch points from branch point candidates, the retrieval device expands the path trie on the basis of the branch point of the query. the query "Q4=/Syain[ACT/chara/name="SIGMA BLUE"]/ACT/cast/name." branches at "Syain". For example, to display the position specified by this query on the path trie, the retrieval device expands a subtree connected under "Syain," as illustrated in FIG. 10. FIG. 10 illustrates an example of the expanded path trie. After the expansion of the path trie, the retrieval device displays, on the path trie, the position specified by the query Q4. FIG. 11 illustrates the path trie specified by the query Q4.

Figure 12:
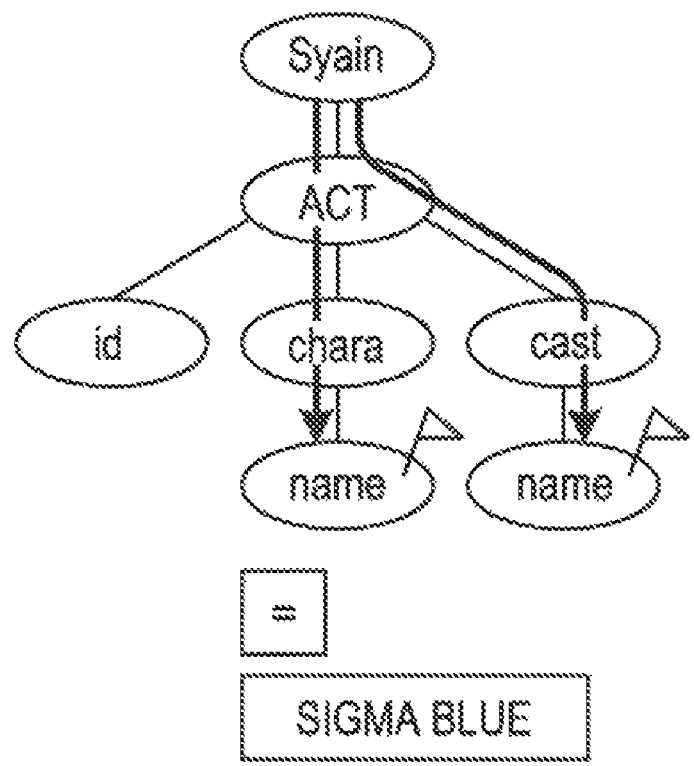
FIG. 12 illustrates a path trie specified by a third query.

Further, the query "Q3=/Syain/ACT[chara/name="SIGMA BLUE"]/cast/name" branches at "ACT". To display, the position specified by the query Q3 on the path trie, the retrieval device expands a subtree connected under "ACT." On the path trie, however, there are already a branch at "ACT" as the start point to "cast" and a branch to "chara," i.e., the path to the output node and the path to the constraint node. In this case, the retrieval device displays the position specified by the query, without expanding the path trie. FIG. 12 illustrates the path trie showing the position specified by the query Q3.

If the path tries and queries illustrated in FIGS. 11 and 12 are displayed, the user can easily understand the difference between the queries. That is, the user can create and/or select a desired query, simply by specifying the output node and the constraint node and thereafter selecting one of the query candidates displayed by the retrieval device. If one of the queries is selected by the user, the retrieval device retrieves the data from the XML data corresponding to the selected query, and outputs the retrieval result.

As described above, if there is a plurality of conceivable queries, the retrieval device according to the present embodiment expands the path trie on the basis of the output node and the constraint node specified by the user, to thereby differentiate the queries and allow the user to select a desirable query. The retrieval device supports the creation of a complicated query containing a constraint condition, while maintaining the intuitive method for displaying a path trie.

Figure 13:
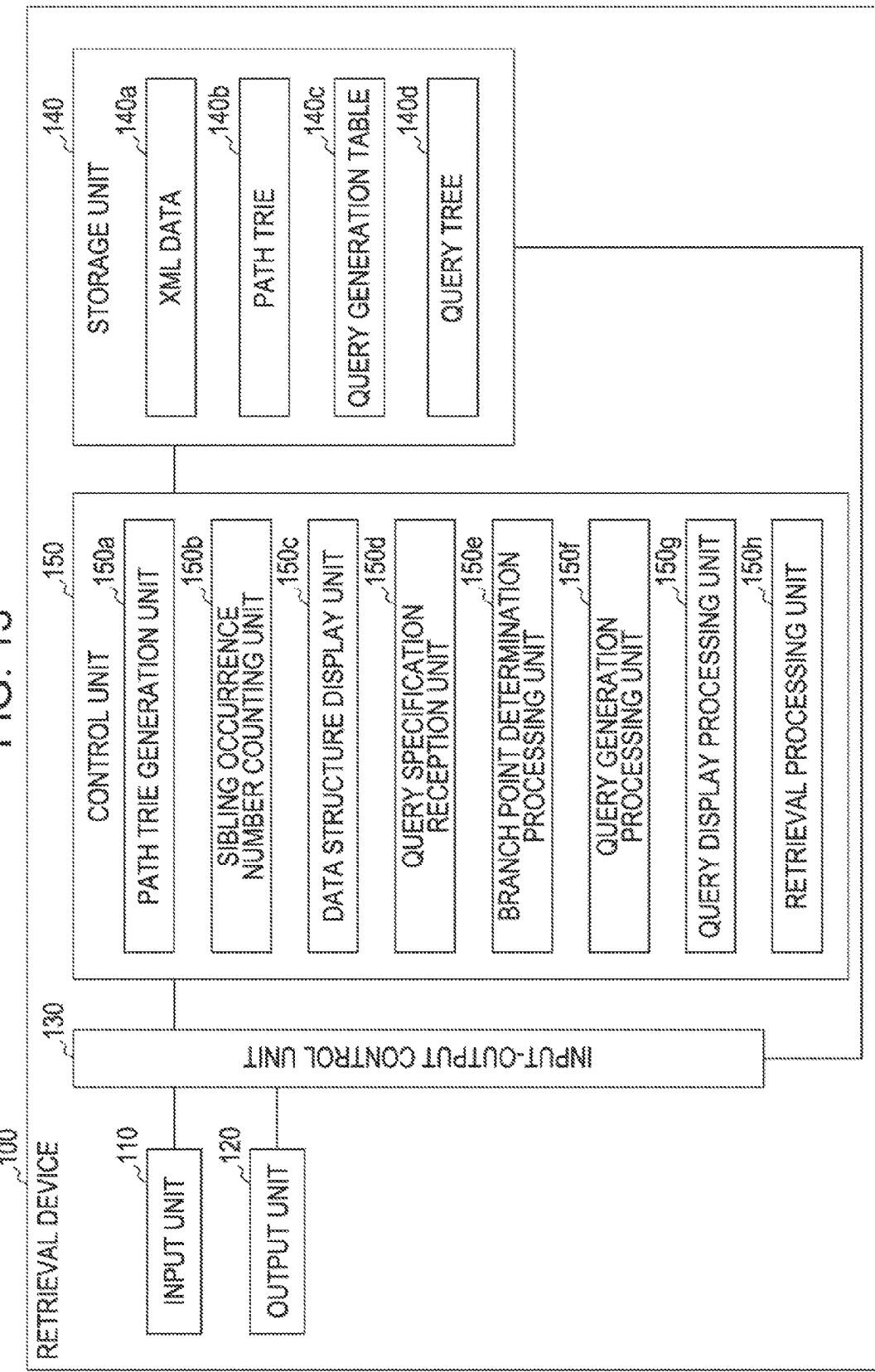
FIG. 13 illustrates a configuration of a retrieval device according to the present embodiment.

FIG. 13 illustrates a configuration of the retrieval device according to the present embodiment. The retrieval device 100 includes an input unit 110, an output unit 120, an input-output control unit 130, a storage unit 140, and a control unit 150.

The input unit 110 is configured to input various information such as the output node and/or the constraint node, for example. The input unit 110 may be a keyboard, a mouse, a microphone, and so forth. The output unit 120 is configured to output various information such as the query, the XML data, the path trie, and/or the retrieval result. The output unit 120 may be a monitor, a display, a touch panel, and so forth. The input-output control unit 130 controls the input and output of data by the input unit 110, the output unit 120, the storage unit 140, and the control unit 150.

The storage unit 140 stores data and programs for various processes performed by the control unit 150. The storage unit 140 includes XML data 140a, a path trie 140b, a query generation table 140c, and a query tree 140d.

The XML data 140a is document data having a hierarchical structure in which elements are divided by element identifiers such as "<" and "</," as illustrated in FIG. 1. The data structure of the XML data 140a is not limited to the data structure illustrated in FIG. 1, and can also be expressed in the tree structure as illustrated in FIG. 2. The path trie 140b is data aggregating the XML data as illustrated in FIG. 6, for example.

Figure 14:
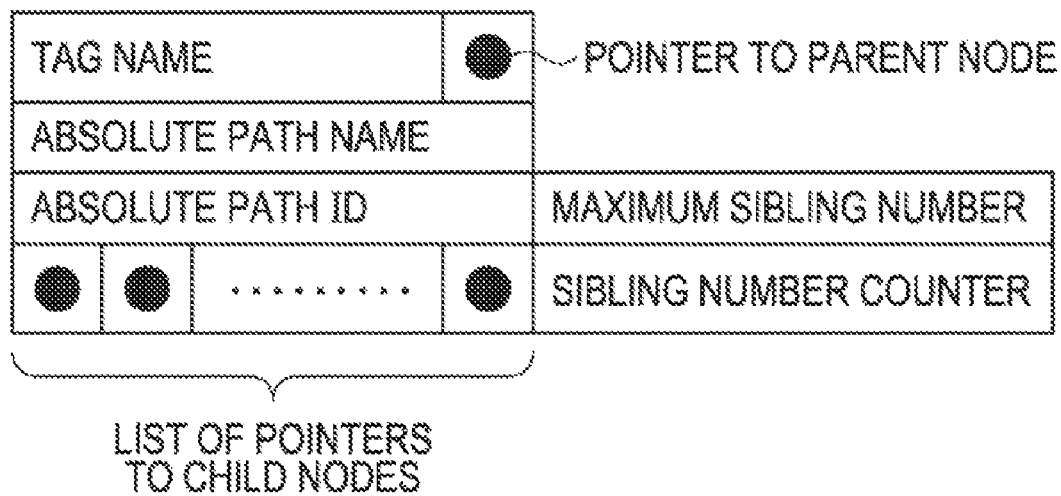
FIG. 14 illustrates an example of the data structure of a path trie node structure.

The path trie 140b in FIG. 13 connects a plurality of path trie node structures with one another. FIG. 14 illustrates an example of the data structure of a path trie node structure. As illustrated in FIG. 14, the path trie node structure includes a tag name, an absolute path name, an absolute path ID for identifying the absolute path, a maximum sibling number, a sibling number counter, a pointer to the parent node, and a list of pointers to the child nodes.

Figure 6:
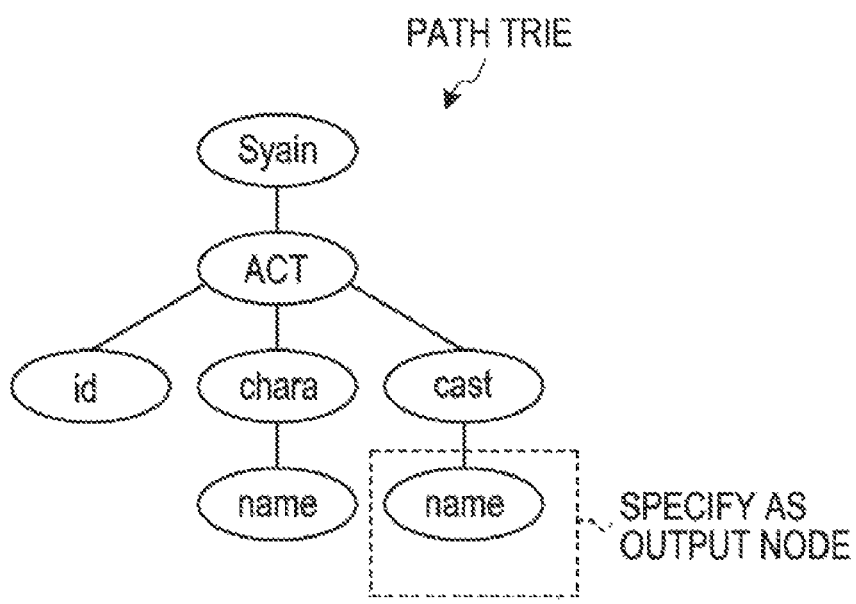
FIG. 6 illustrates an example of the data structure of a path trie.

For example, in the case of a path trie node structure corresponding to "ACT" of the path trie illustrated in FIG. 6, the tag name is "ACT," the absolute path name is "/Syain/ACT," and the absolute path ID is "2". The pointer to the parent node is connected to a path trie node structure having a tag name "Syain." The pointers to the child nodes are connected to path trie node structures having tag names "id," "chara," and "cast," respectively.

Figure 15:
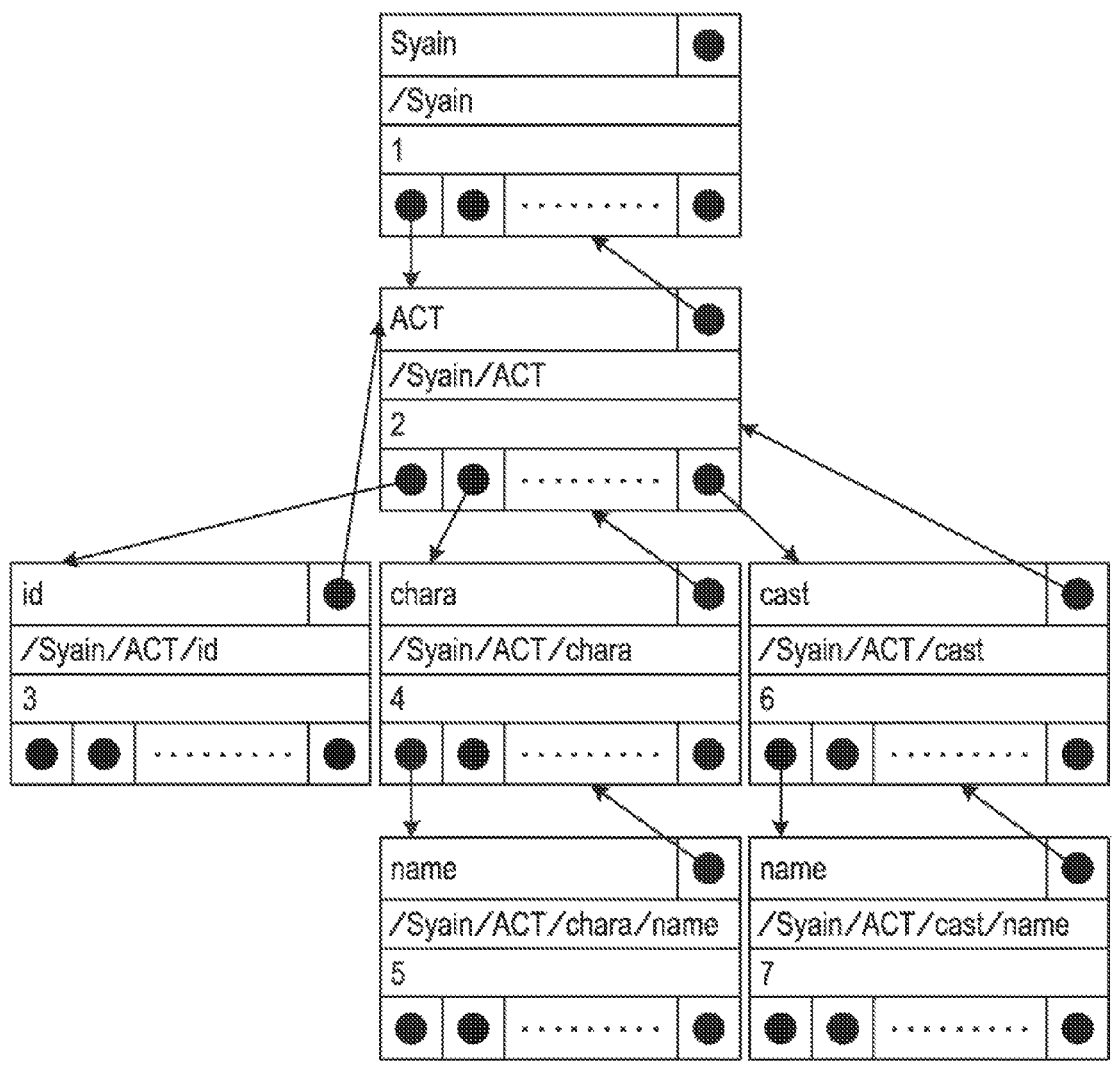
FIG. 15 illustrates a path trie in path trie node structures.

The path trie illustrated in FIG. 6 can be expressed in a plurality of path trie node structures, as illustrated in FIG. 15. FIG. 15 illustrates the path trie in the path trie node structures. In FIG. 15, the maximum sibling number and the sibling number counter are not illustrated, for convenience sake, in each of the path trie node structures.

The query generation table 140c in FIG. 13 is a table for managing the absolute paths corresponding to the above-described output node, constraint node and branch point. FIG. 16 illustrates an example of the data structure of the query generation table 140c. In FIG. 16, the query generation table 140c stores the type for identifying the output node, the type for identifying the constraint node, and the type for identifying branch point node, the absolute path of these nodes, the operator and the value (the text node) of the constraint node.

Figure 17:
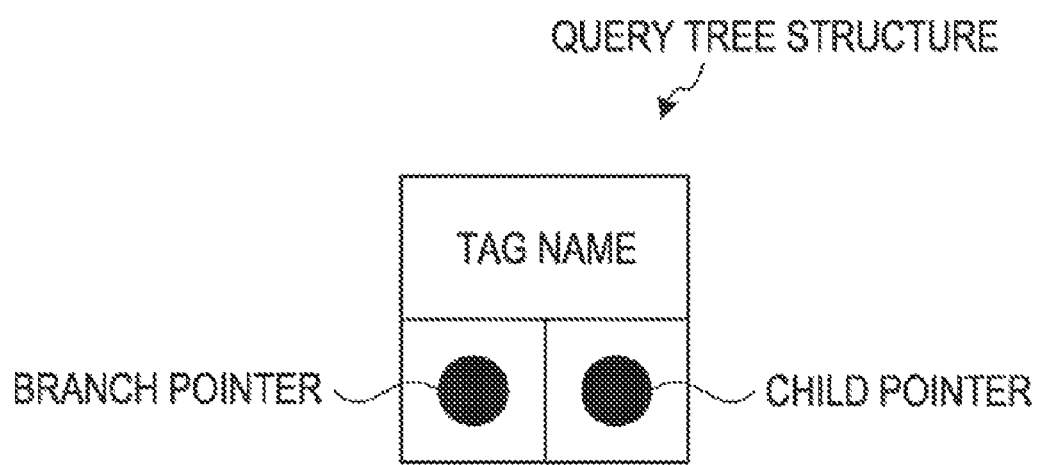
FIG. 17 illustrates an example of the data structure of a query tree structure.

The query tree 140d in FIG. 13 is tree-structured data of a query generated by the control unit 150 on the basis of the specification of the output node and the constraint node. If a plurality of queries is generated, the query tree 140d includes query trees corresponding to the plurality of queries. A query tree connects a plurality of query tree structures with one another. FIG. 17 illustrates an example of the data structure of a query tree. The query tree structure includes a tag name, a branch pointer, and a child pointer.

Figure 18:
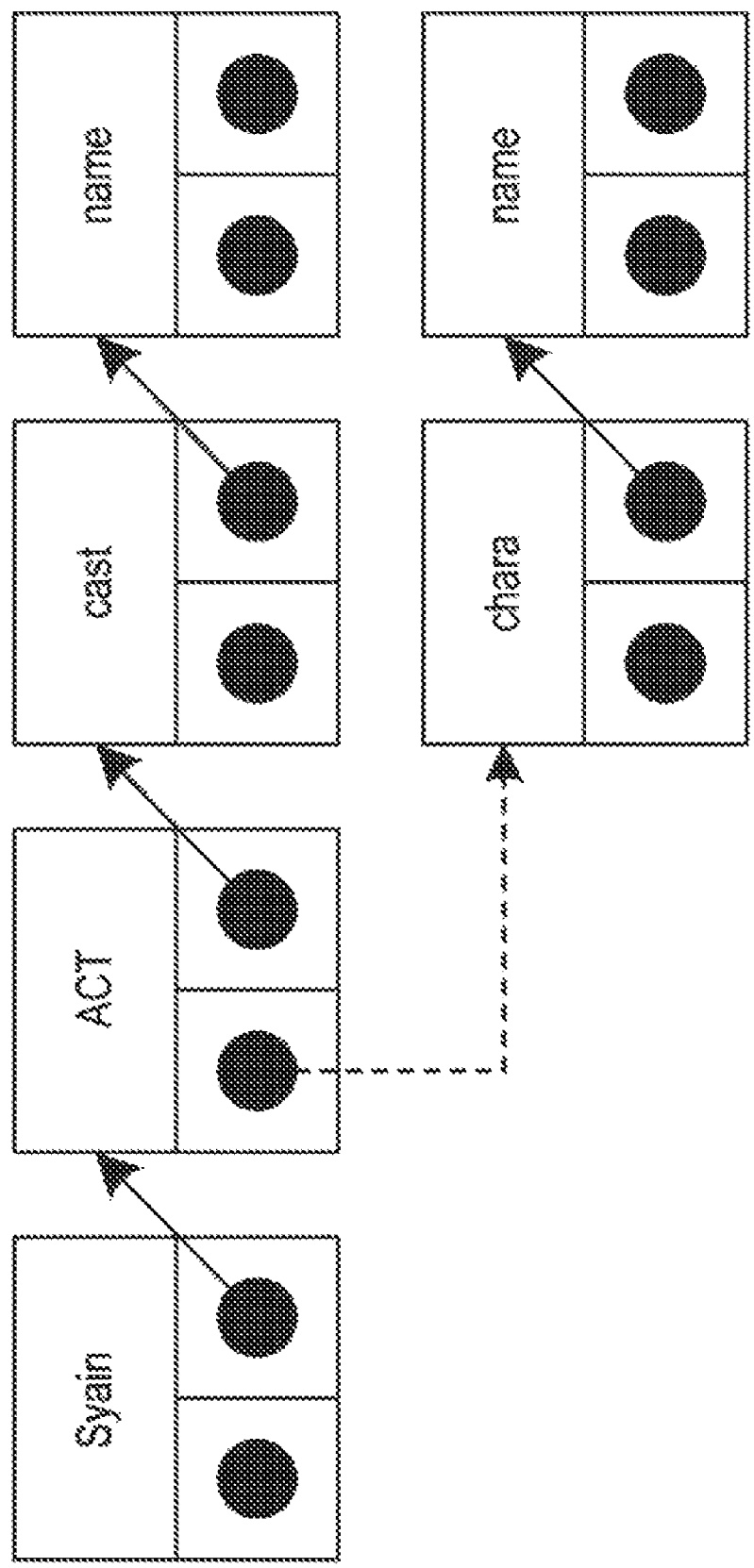
FIG. 18 illustrates the first query in query tree structures.

For example, the query "/Syain/ACT[chara/name="SIGMA BLUE"]/cast/name" is expressed in query tree structures illustrated in FIG. 18. In the query "/Syain/ACT[chara/name="SIGMA BLUE"]/cast/name," a constraint condition is inserted immediately after "ACT." Therefore, "ACT" serves as the branch point. And the query tree structure of "chara" is connected to the branch pointer of "ACT."

Figure 19:
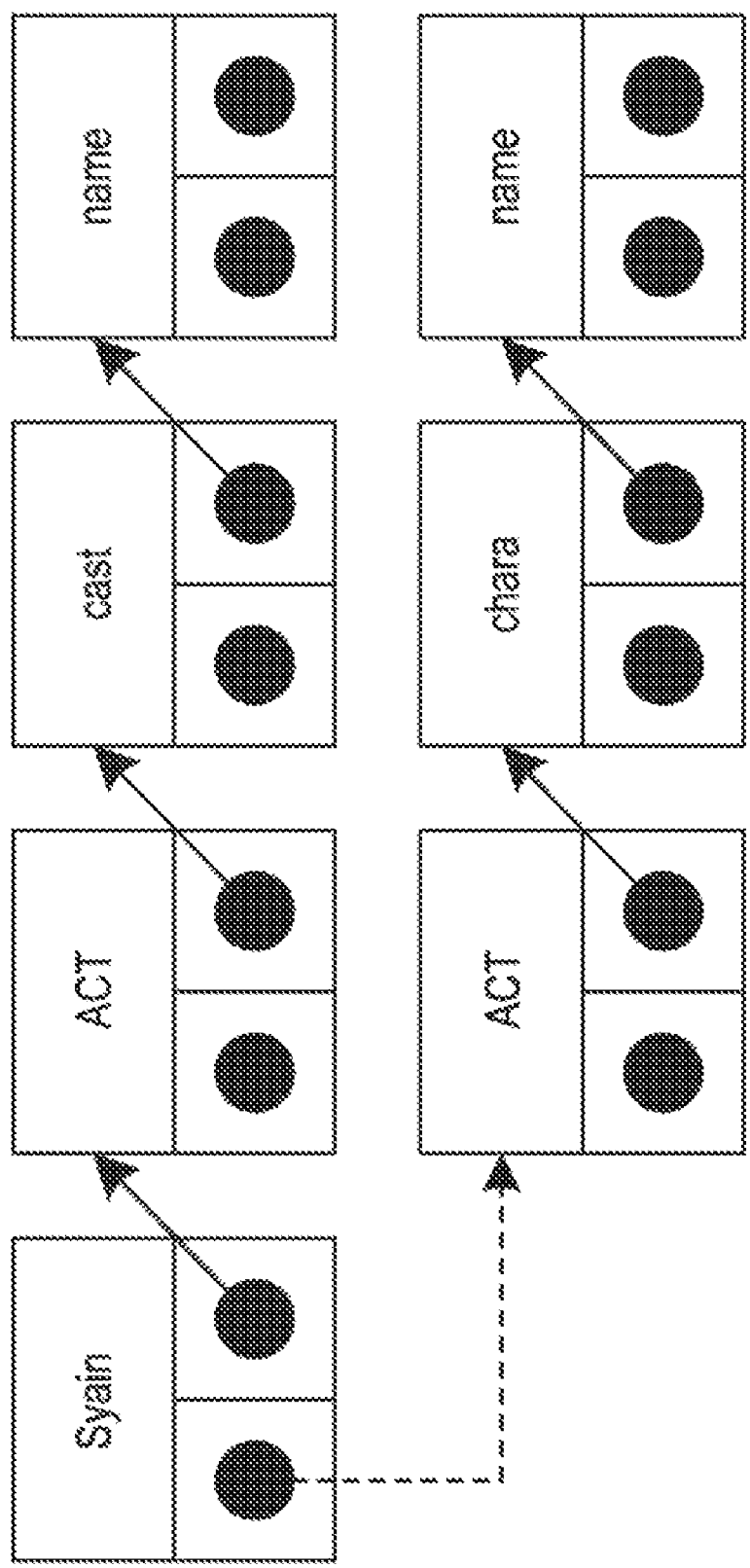
FIG. 19 illustrates the second query in query tree structures.

Meanwhile, the query "/Syain[ACT/chara/name="SIGMA BLUE"]/ACT/cast/name" is expressed in query tree structures illustrated in FIG. 19. In the query "/Syain[ACT/chara/name="SIGMA BLUE"]/ACT/cast/name," a constraint condition is inserted immediately after "Syain." Therefore, "Syain" serves as the branch point. And the query tree structure of "ACT" is connected to the branch pointer of "Syain."

The control unit 150 in FIG. 13 includes an internal memory for storing control data and programs specifying various process procedures, and which performs various processes on the basis of the control data and the programs. The control unit 150 includes a path trie generation unit 150a, a sibling occurrence number counting unit 150b, a data structure display unit 150c, a query specification reception unit 150d, a branch point determination processing unit 150e, a query generation processing unit 150f, a query display processing unit 150g, and a retrieval processing unit 150h.

The path trie generation unit 150a aggregates, for example, the XML data 140a illustrated in FIGS. 1 and 2, and creates the path trie illustrated, for example, in FIGS. 6, 14, and 15. The path trie generation unit 150a first determines, for each of the element nodes present in the tree-structured data of the XML data 140a, whether or not there is a plurality of child nodes having the same tag name and directly connected to parent nodes having the same tag name.

If there is a plurality of child nodes having the same tag name and directly connected to parent nodes having the same tag name, the path trie generation unit 150a aggregates the overlapping parent nodes having the same tag name into one parent node, and aggregates the overlapping child nodes having the same tag name into one child node. Thereby, the path trie 140b is generated.

For example, in the XML data illustrated in FIG. 2, there is a plurality of child nodes "id," "chara," and "cast" having the same tag name and directly connected to parent nodes "ACT" having the same tag name. And there is a plurality of child nodes "name" directly connected to parent nodes "chara" having the same tag name. Further, there is a plurality of child nodes "name" directly connected to parent nodes "cast" having the same tag name.

Therefore, the path trie generation unit 150a aggregates ACT3, 12, and 21 into one "ACT," id4, 13, and 22 into one "id," chara6 and 15 into one "chara," and cast9, 18, and 24 into one "cast." Further, the path trie generation unit 150a aggregates name7 and 16 into one "name," and name10, 19, and 25 into one "name." As a result, the XML data 140a illustrated in FIG. 2 is aggregated into the path trie 140b illustrated in FIG. 6. At this point, the maximum sibling number and the sibling number counter included in each of the path trie node structures of the path trie 140b have a NULL value.

The sibling occurrence number counting unit 150b determines, on the basis of the element nodes included in the path trie 140b and the XML data 140a, the number of siblings of each of the element nodes of the XML data 140a corresponding to the element nodes of the path trie 140b.

In FIG. 2, the element node "Syain" of the XML data 140a is the root node, and thus has no sibling. Therefore, the sibling occurrence number counting unit 150b sets one as the maximum sibling number corresponding to the tag name "Syain" of the path trie node structures in the path trie 140b.

The sibling occurrence number counting unit 150b determines the number of siblings of the element node "ACT." With reference to FIG. 2, there are three element nodes "ACT" directly connected to the specific parent node which is Syain1. Therefore, the sibling occurrence number counting unit 150b sets three as the maximum sibling number corresponding the tag name "ACT" of the path trie node structures in the path trie 140b.

The sibling occurrence number counting unit 150b also determines the number of siblings of each element nodes "id," "chara," "cast," and "name." None of these element nodes has a sibling node which has the same tag name and is connected to the parent node having a specific node ID. Therefore, the sibling occurrence number counting unit 150b sets one as the maximum sibling number corresponding the tag names "id," "chara," "cast," and "name" of the path trie node structures in the path trie 140b.

The data structure display unit 150c in FIG. 13 outputs the path trie 140b to the output unit 120. The user operates the input unit 110, and specifies the output node and the constraint node with reference to the path trie 140b displayed on the monitor.

The query specification reception unit 150d in FIG. 13 registers various information in the query generation table 140c when the output node and the constraint node are specified by the user. The query specification reception unit 150d outputs an operator specification window and a value specification window to the output unit 120. The operator specification window is an input window for allowing the user to input operators such as "=" and a partial match operator. The value specification window is an input window for allowing the user to input various text (e.g., SIGMA BLUE).

The processing by the query specification reception unit 150d will be described below. FIGS. 20A and 20B describe an example of the processing by the query specification reception unit 150d. In FIGS. 20A and 20B, a case will be described in which "name" directly connected to "cast" is specified as the output node, and "name" directly connected to "chara" is specified as the constraint node. However, the configuration is not limited to this example.

As illustrated in the upper part FIG. 20A, if the user specifies, as the output node, "name" directly connected to "cast," the query specification reception unit 150d arranges the tag names from the root node "Syain" to the output node "name." Thereby, an absolute path "/Syain/ACT/cast/name" is generated. The node specified by the user is the output node. Therefore, the query specification reception unit 150d registers, in the query generation table 140c, the type "OUTPUT" and the absolute path "/Syain/ACT/cast/name" in association with each other.

Next, as illustrated in the lower part of FIG. 20A, if the user specifies, as the constraint node, "name" directly connected to "chara," the query specification reception unit 150d arranges the tag names from the root node "Syain" to the constraint node "name." Thereby, an absolute path "/Syain/ACT/chara/name" is generated. The node specified by the user is the constraint node. Therefore, the query specification reception unit 150d registers, in the query generation table 140c, the type "CONSTRAINT" and the absolute path "/Syain/ACT/chara/name" in association with each other.

As illustrated in the upper part FIG. 20B, after the receipt of the output node and the constraint node, the query specification reception unit 150d displays the operator specification window and the value specification window on the monitor, to specify a constraint condition. The user operates the input unit 110 to input an operator in the operator specification window and to input a value in the value specification window.

As illustrated in the lower part of FIG. 20B, If the user inputs "=" in the operator specification window and inputs "SIGMA BLUE" in the value specification window, the query specification reception unit 150d registers, in the query generation table 140c, the operator "=" and the value "SIGMA BLUE" in association with the type "CONSTRAINT."

If the output node and the constraint node are specified, the branch point determination processing unit 150e in FIG. 13 determines the branch point on the basis of the specified nodes. The processing by the branch point determination processing unit 150e is described below. FIG. 21 explains the processing by the branch point determination processing unit 150e. The number in parentheses shown next to each of the nodes represents the maximum sibling number of the node. That is, the maximum sibling number of "ACT" is three, and the maximum number of "Syain," "id," "chara," "cast," and "name" is one.

The branch point determination processing unit 150e first compares the absolute path of the output node with the absolute path of the constraint node to determine the common prefixes, and registers the determination result in the query generation table 140c. For example, if the absolute path of the output node (output path) is "/Syain/ACT/cast/name," and if the absolute path of the constraint node (constraint path) is "/Syain/ACT/chara/name," as illustrated in the upper part of FIG. 21, the nodes corresponding to the common prefixes are "Syain" and "ACT" common to both paths.

Then, on the basis of the branch point discrimination rules (first and second rules), the branch point determination processing unit 150e determines the node serving as the branch point among the common prefixes. Herein, a case will be described in which "Syain" and "ACT" have been determined as the common prefixes.

According to the first rule, among the common prefixes (branch point candidates), the lowest branch point candidate is determined to be the branch point. Between the nodes "Syain" and "ACT," "ACT" is the lowest branch point candidate. Therefore, the branch point determination processing unit 150e determines "ACT" to be the branch point.

According to the second rule, among the common prefixes, the branch point candidate having a child node, the maximum sibling occurrence number of which is two or more, is determined to be the branch point. The child node "ACT" of "Syain" has a maximum sibling number of "3." Therefore, the branch point determination processing unit 150e determines "Syain" to be the branch point.

The branch point determination processing unit 150e registers, in the query generation table 140c, the information of the node determined to be the branch point. The absolute path of "Syain" is "/Syain," and the absolute path of "ACT" is "/Syain/ACT." Therefore, as illustrated in the lower part of FIG. 21, the branch point determination processing unit 150e registers, in the query generation table 140c, the type "BRANCH" and the absolute path "/Syain/ACT" in association with each other. Further, the branch point determination processing unit 150e registers, in the query generation table 140c, the type "BRANCH" and the absolute path "/Syain" in association with each other.

The query generation processing unit 150f in FIG. 13 generates a query on the basis of the query generation table 140c. The processing by the query generation processing unit 150f will be described below. The query generation processing unit 150f refers to the query generation table 140c, and extracts the absolute path corresponding to the type "OUTPUT." If the current state of the query generation table 140c is the state illustrated in FIG. 16, the absolute path to be extracted is "/Syain/ACT/cast/name."

Figure 22:
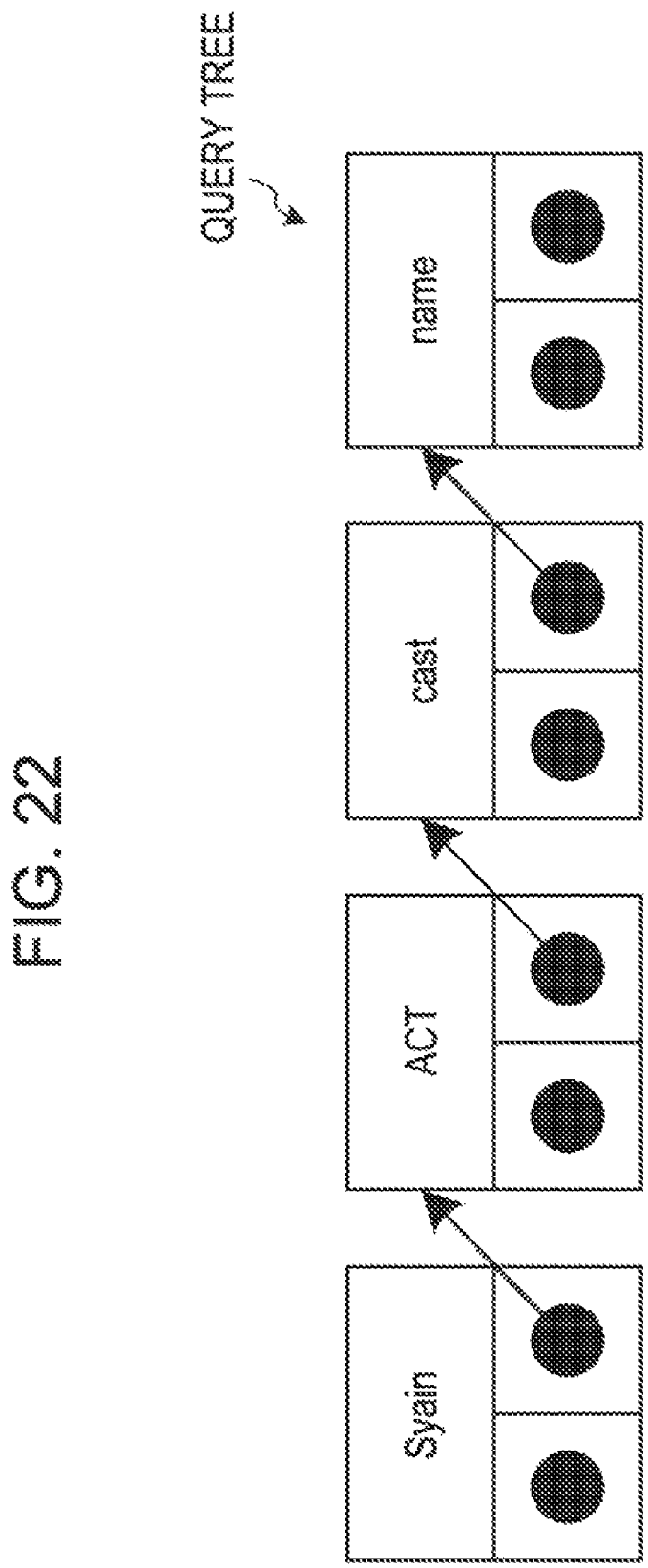
FIG. 22 illustrates an example of a query tree generated from an absolute path.

Then, the query generation processing unit 150f generates query tree structures corresponding to the respective elements of the extracted absolute path, and connects the query tree structures in accordance with the absolute path. FIG. 22 illustrates an example of a query tree generated from the absolute path. In FIG. 22, query tree structures corresponding to "Syain," "ACT," "cast," and "name" are connected in the order of the absolute path.

Further, the query generation processing unit 150f extracts, from the query generation table 140c, the absolute path corresponding to the type "CONSTRAINT" and the absolute path corresponding to the type "BRANCH." Then, on the basis of the query tree illustrated in FIG. 22, the absolute path of the constraint node, and the absolute path of the branch point, the query generation processing unit 150f adds query tree structures to the query tree.

If the absolute path of the constraint node is "/Syain/ACT/chara/name," and if the absolute path of the branch point is "/Syain/ACT," the query tree illustrated in FIG. 18 is generated. That is, the query generation processing unit 150f generates the query tree structures corresponding to the path remaining after the removal of the absolute path of the branch point from the absolute path of the constraint node. In this case, the query generation processing unit 150f generates the query tree structures "chara" and "name". Then, the query generation processing unit 150f connects the generated query tree structures "chara" and "name," with the query tree structure "ACT" at the branch point set as the start point.

Meanwhile, if the absolute path of the constraint node is "/Syain/ACT/chara/name," and if the absolute path of the branch point is "/Syain," the query tree illustrated in FIG. 19 is generated. That is, the query generation processing unit 150f generates the query tree structures corresponding to the path remaining after the removal of the absolute path of the branch point from the absolute path of the constraint node. In this case, the query generation processing unit 150f generates the query tree structures "ACT," "chara," and "name". The query generation processing unit 150f sequentially connects the generated query tree structures "ACT," "chara," and "name," with the query tree structure "Syain" at the branch point set as the start point.

The query generation processing unit 150f registers the generated query tree in the storage unit 140. If the data registered in the query generation table 140c is the data illustrated in FIG. 16, the query generation processing unit 150f registers the query tree illustrated in FIG. 18 and the query tree illustrated in FIG. 19 as the query tree 140d.

The query display processing unit 150g in FIG. 13 expands the path trie 140b on the basis of the query tree 140d and the query generation table 140c, and thereafter displays the expanded path trie and the location specified by the query to receive the selection of an optimal query. FIG. 23 explains the processing by the query display processing unit 150g.

The query display processing unit 150g expands the path trie 140b on the basis of the node at the branch point of the query generation table 140c. With the upper part of FIG. 23, description will be made of a case in which the path trie 140b is expanded on the basis of the branch "/Syain/ACT." The query display processing unit 150*g* determines the lowest node of the branch path, and attempts to duplicate a subtree having a child node of the determined node as the highest node of the subtree.

On the path trie, however, there are already a branch to "cast" and a branch to "chara," i.e., the path to the output node and the path to the constraint node, which branch at "ACT." In this case, the query display processing unit 150*g* directly displays the path trie, and also displays the constraint node and the output node. Further, the query display processing unit 150*g* displays the operator "=" and the value "SIGMA BLUE," which are stored in the row of the type "CONSTRAINT" in the query generation table 140*c*, in association with the constraint node. Further, the query display processing unit 150*g* displays the corresponding query "/Syain/ACT [chara/name="SIGMA BLUE"]/cast/name".

With the lower part of FIG. 23, Description will be made of a case in which the path trie 140*b* is expanded on the basis of the branch "/Syain." The query display processing unit 150*g* determines the lowest node of the branch path, duplicates a subtree having a child node of the determined node as the highest node of the subtree, and connects the duplicated subtree to "Syain." Thereby, a new path trie is generated. In this case, the query display processing unit 150*g* duplicates a subtree having "ACT" as the highest node thereof.

Then, the query display processing unit 150*g* displays the constraint node by using one of the subtrees of the expanded path trie, and displays the output node by using the other subtree. Further, the query display processing unit 150*g* displays the operator "=" and the value "SIGMA BLUE," which are stored in the row of the type "CONSTRAINT" in the query generation table 140*c*, in association with the constraint node. Further, the query display processing unit 150*g* displays the corresponding query "/Syain[ACT/chara/nanne="SIGMA BLUE"]/ACT/cast/name".

The query display processing unit 150*g* displays, on the monitor, the path tries and queries illustrated in FIG. 23 to allow the user to select one of the queries. Upon receipt of the selection of the query, the query display processing unit 150*g* outputs the selected query to the retrieval processing unit 150*h*.

Upon acquisition of the query from the query display processing unit 150*g*, the retrieval processing unit 150*h* retrieves data corresponding to the query from the XML data and outputs the retrieval result to the output unit 120. Any method can be used for the data retrieval using the query.

If there is a XML data as illustrated in FIG. 4, and the retrieval processing unit 150*h* gets the query "/Syain/ACT [chara/nanne="SIGMA BLUE"]/cast/name," the retrieval processing unit 150*h* outputs "<name>SHINICHIRO TAGO</name>" as the retrieval result.

Figure 24:
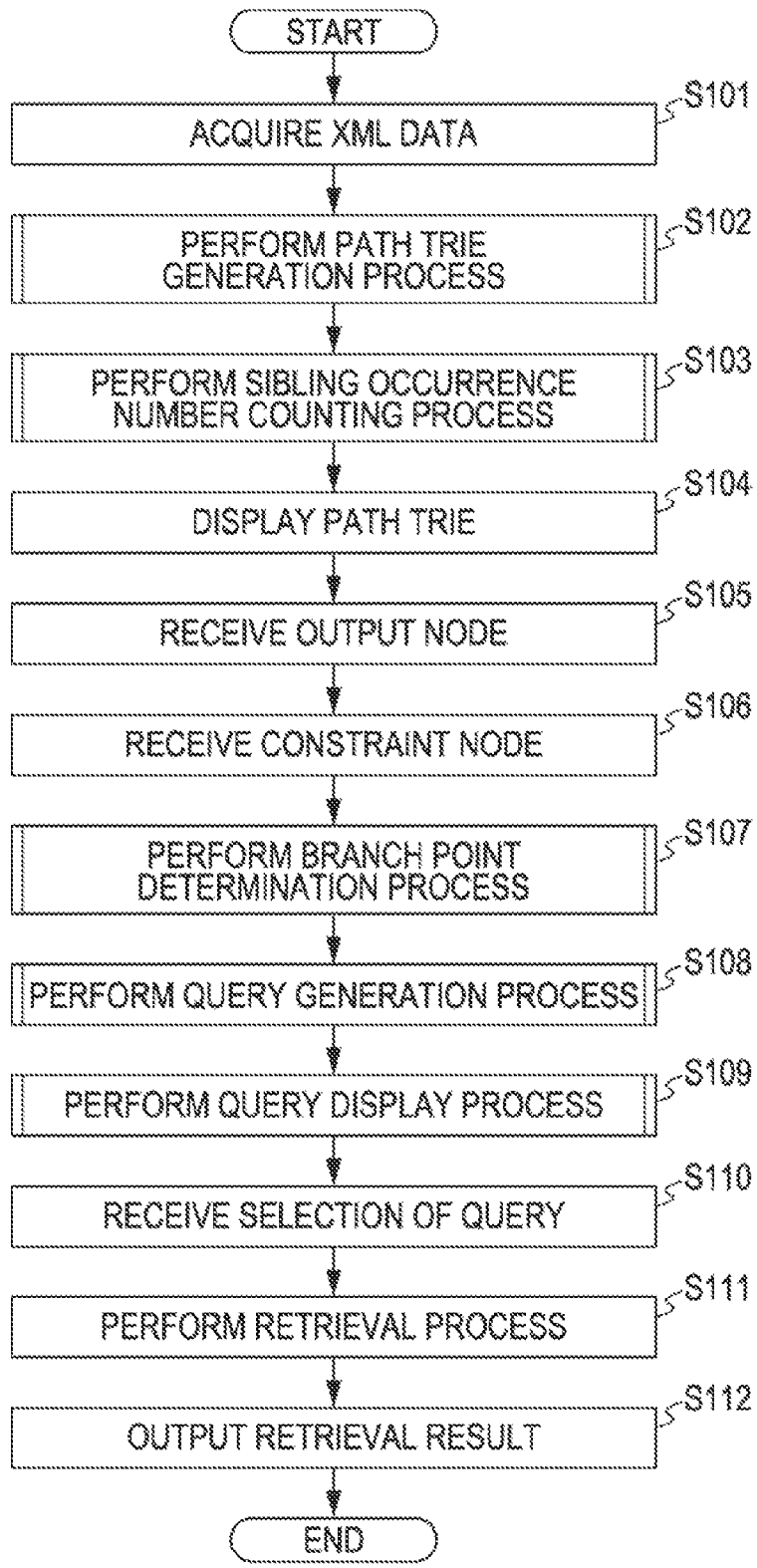
FIG. 24 illustrates a process procedure of the retrieval device according to the present embodiment.

A process procedure of the retrieval device 100 according to the present embodiment will be described. FIG. 24 is a flowchart illustrating a process procedure of the retrieval device 100 according to the present embodiment. As illustrated in FIG. 24, the retrieval device 100 acquires the XML data (S101), and the path trie generation unit 150*a* performs the path trie generation process (S102).

Then, the sibling occurrence number counting unit 150*b* performs the sibling occurrence number counting process (S103), and the data structure display unit 150*c* displays the path trie before the path trie is subjected to the expansion process (S104). Then, the query specification reception unit 150*d* receives the output node (S105), and receives the constraint node (S106).

Then, the branch point determination unit 150*e* performs the branch point determination process (S107), and the query generation processing unit 150*f* performs the query generation process (S108). Then, the query display processing unit 150*g* performs the query display process (S109).

The query display processing unit 150*g* receives the selection of the query (S110), and the retrieval processing unit 150*h* performs the retrieval process on the basis of the selected query (S111), and outputs the retrieval result (S112).

Figure 25:
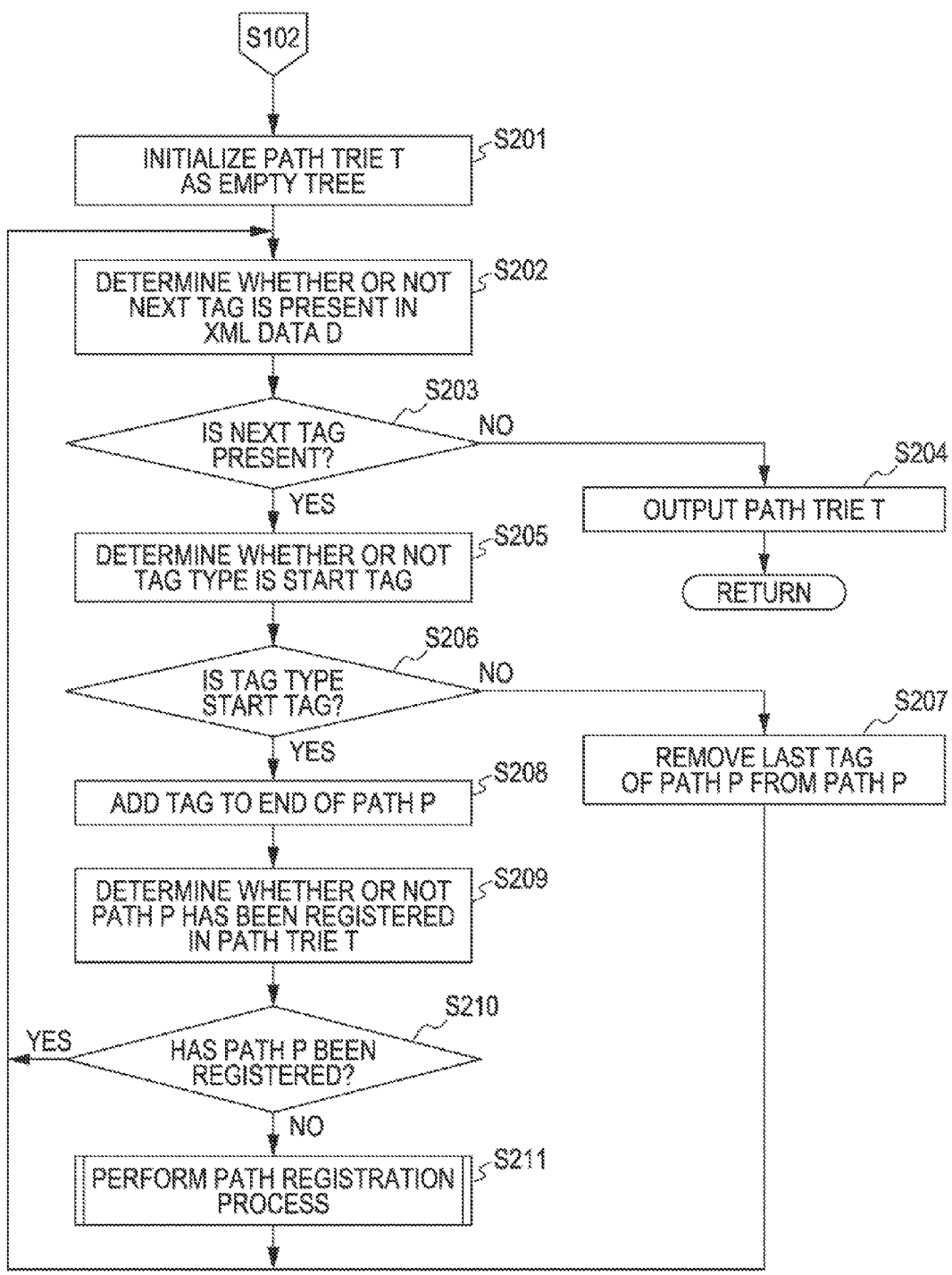
FIG. 25 illustrates a process procedure of a path trie generation process.

The path trie generation process illustrated as S102 of FIG. 24 will be described in greater detail with respect to FIG. 25. FIG. 25 is a flowchart illustrating a process procedure of the path trie generation process. As illustrated in FIG. 25, the path trie generation unit 150*a* initializes a path trie T as an empty tree (S201), and determines whether or not the next tag "<" or "</" is present in XML data D (S202).

If the next tag is absent (NO at S203), the path trie generation unit 150*a* outputs the path trie T (S204). Meanwhile, if the next tag is present (YES at S203), the path trie generation unit 150*a* determines whether or not the tag type is the start tag (S205). Herein, the tag "<" represents the start tag, and the tag "</" represents the end tag.

If the tag type is the end tag (NO at S206), the path trie generation unit 150*a* removes the last tag of a path P from the path P (S207), and moves to S202. Meanwhile, if the tag type is the start tag (YES at S206), the path trie generation unit 150*a* adds the tag to the end of the path P (S208).

Then, the path trie generation unit 150*a* determines whether or not the path P has been registered in the path trie T (S209). If the path P has been registered (YES at S210), the path trie generation unit 150*a* moves to S202. Meanwhile, if the path P has not been registered (NO at S210), the path trie generation unit 150*a* performs a path registration process (S211).

Figure 26:
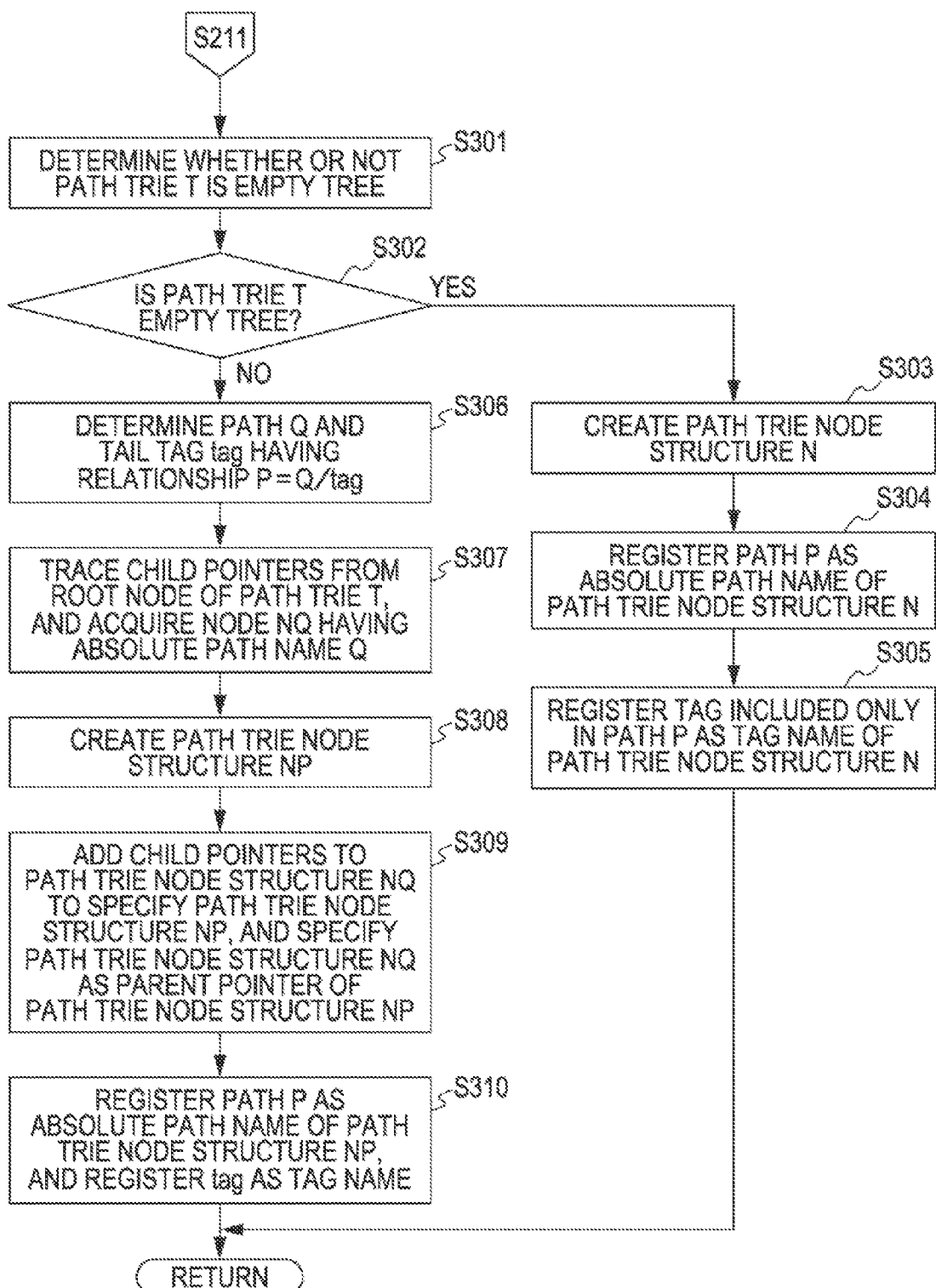
FIG. 26 illustrates a process procedure of a path registration process.

Herein, the path registration process illustrated as S211 of FIG. 25 will be described in greater using FIG. 26. FIG. 26 is a flowchart illustrating a process procedure of the path registration process. As illustrated in FIG. 26, the path trie generation unit 150*a* determines whether or not the path trie T is an empty tree (S301).

If the path trie T is an empty tree (YES at S302), the path trie generation unit 150*a* creates a path trie node structure N (S303). Then, the path trie generation unit 150*a* registers the path P as the absolute path name of the path trie node structure N (S304), and registers the tag included only in the path P as the tag name of the path trie node structure N (S305).

Meanwhile, if the path trie T is not an empty tree (NO at S302), the path trie generation unit 150*a* determines a path Q and a tail tag "tag" having the relationship P=Q/tag (S306), and traces the child pointers from the root node of the path trie T to acquire a node NQ having an absolute path name Q (S307).

Then, the path trie generation unit 150*a* creates a path trie node structure NP (S308). Further, the path trie generation unit 150*a* adds child pointers to the path trie node structure NQ to specify the path trie node structure NP, and specifies the path trie node structure NQ as the parent pointer of the path trie node structure NP (S309). Further, the path trie generation unit 150*a* registers the path P as the absolute path name of the path trie node structure NP, and registers "tag" as the tag name (S310).

Figure 27:
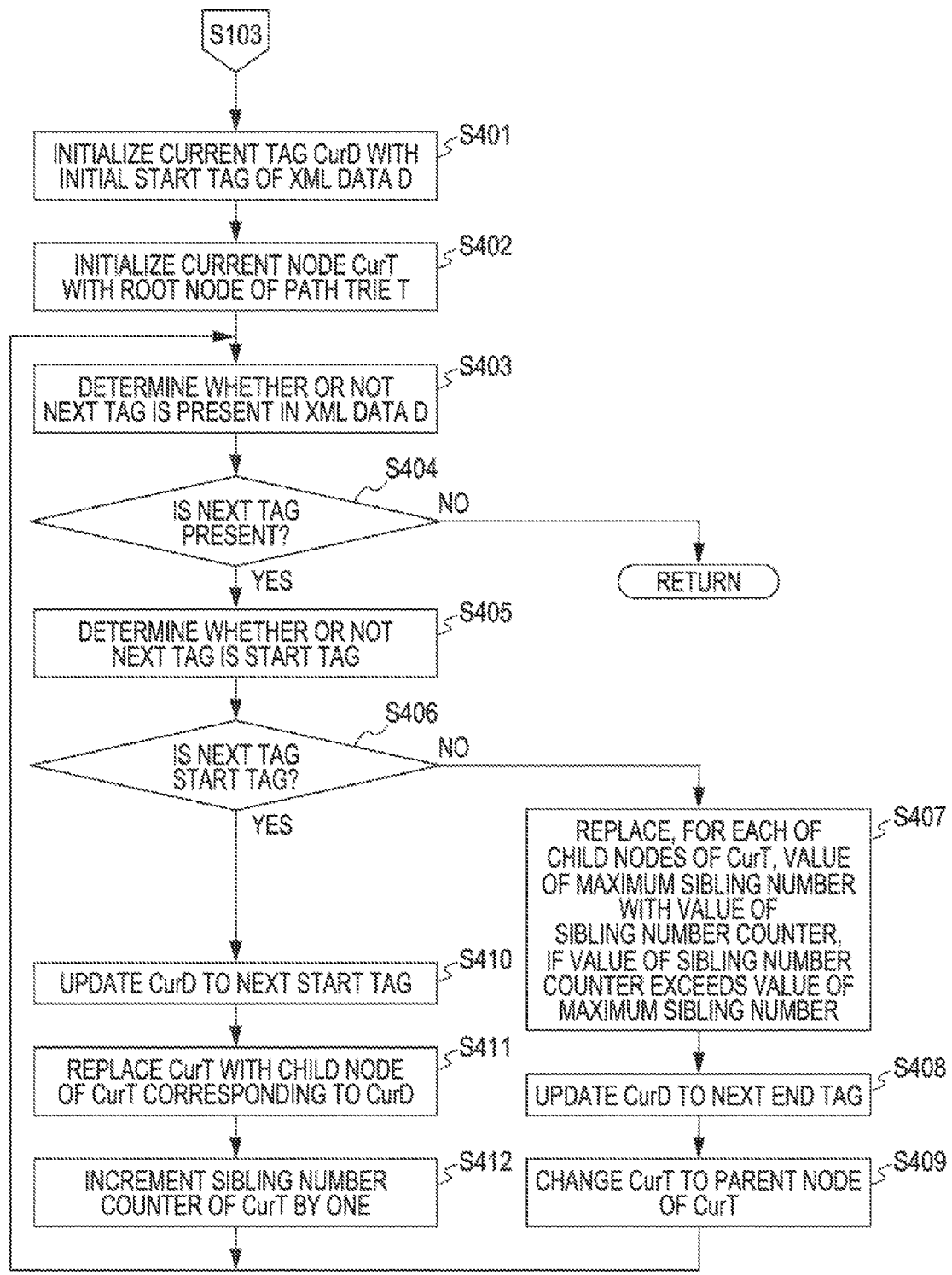
FIG. 27 illustrates a process procedure of a sibling occurrence numbers counting process.

The sibling occurrence number counting process illustrated as S103 of FIG. 24 will be described in greater detail with respect to FIG. 27. FIG. 27 is a flowchart illustrating a process procedure of the sibling occurrence number counting process. As illustrated in FIG. 27, the sibling occurrence number counting unit 150*b* initializes a current tag CurD with the initial start tag of the XML data D (S401), and initializes a current node CurT with the root node of the path trie T (S402).

The sibling occurrence number counting unit 150b determines whether or not the next tag is present in the XML data D (S403). If the next tag is absent (NO at S404), the sibling occurrence number counting unit 150b completes the sibling occurrence number counting process. Meanwhile, if the next tag is present in the XML data D (YES at S404), the sibling occurrence number counting unit 150b determines whether or not the next tag is the start tag "<" (S405).

If the next tag is the end tag "</" (NO at S406), the sibling occurrence number counting unit 150b replaces, for each of the child nodes of the current node CurT, the value of the maximum sibling number with the value of the sibling number counter, if the value of the sibling number counter exceeds the value of the maximum sibling number (S407).

The sibling occurrence number counting unit 150b updates the current tag CurD to the end tag (S408), and changes the current node CurT to the parent node of the current node CurT (S409). Then, the sibling occurrence number counting unit 150b moves to S403.

Meanwhile, if the next tag is the start tag at S406 (YES at S406), the sibling occurrence number counting unit 150b updates the current tag CurD to the next start tag (S410), and replaces the current node CurT with the child node of the current node CurT corresponding to the current tag CurD (S411). Further, the sibling occurrence number counting unit 150b increments the sibling number counter of the current node CurT by one (S412), and moves to S403.

Figure 28:
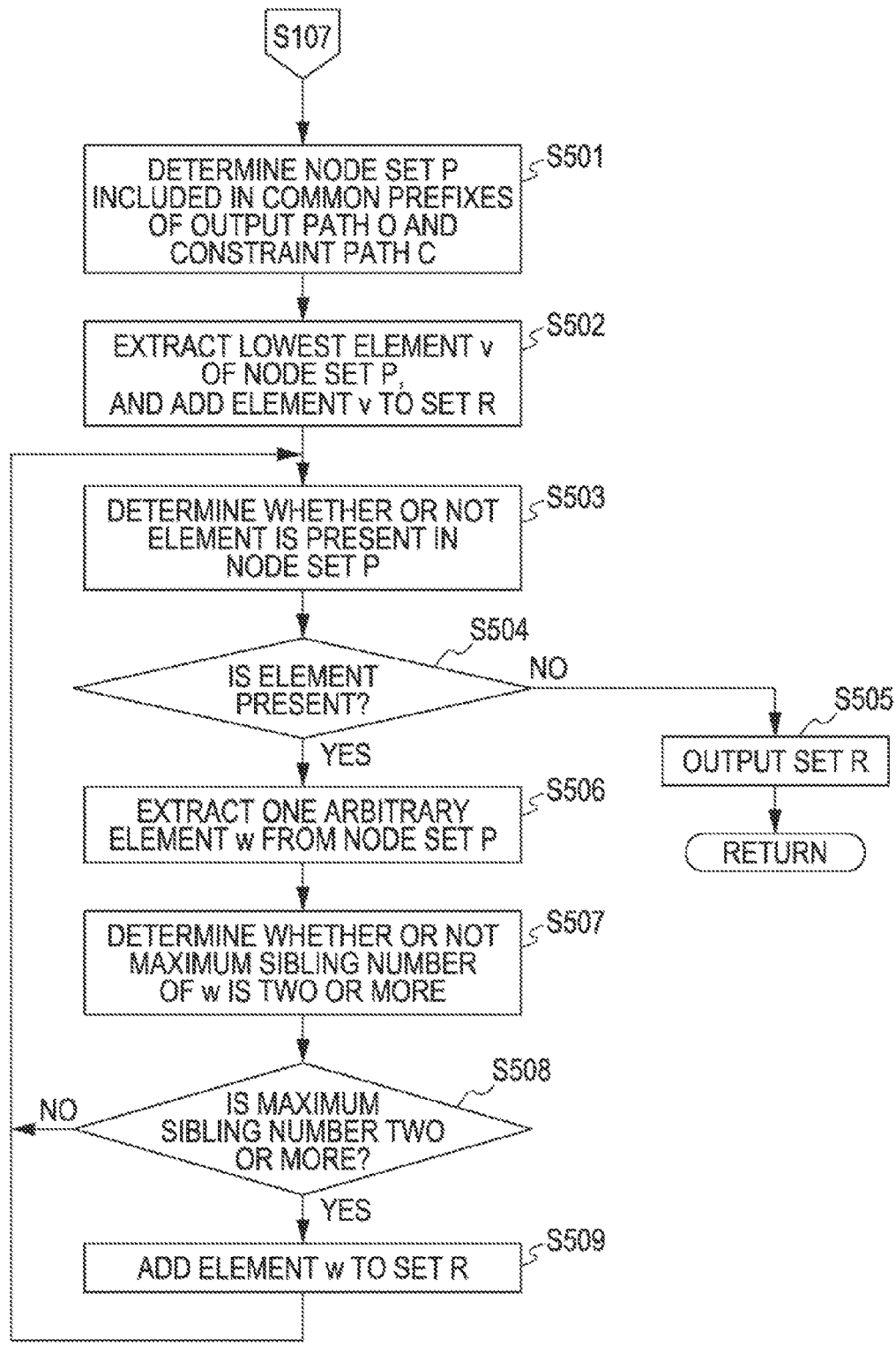
FIG. 28 illustrates a process procedure of a branch point determination process.

The branch point determination process illustrated as S107 of FIG. 24 will be described in greater detail with respect to FIG. 28. FIG. 28 is a flowchart illustrating a process procedure of the branch point determination process. As illustrated in FIG. 28, the branch point determination processing unit 150e determines a node set P included in the common prefixes of an output path O and a constraint path C (S501). Then, the branch point determination processing unit 150e extracts a lowest element v of the node set P, and adds the element v to a set R (S502). At S502, the branch point determination processing unit 150e sets the set R={v} and the node set P=P\{v}.

The branch point determination processing unit 150e determines whether or not an element is present in the node set P (S503). If an element is absent (NO at S504), the branch point determination processing unit 150e outputs the set R (S505), and completes the branch point determination process S107.

Meanwhile, if an element is present in the node set P (YES at S504), the branch point determination processing unit 150e extracts one arbitrary element w from the node set P (S506), and determines whether or not the maximum sibling number of the element w is two or more (S507).

If the maximum sibling number of the element w is less than two (NO at S508), the branch point determination processing unit 150e moves to S503. Meanwhile, if the maximum sibling number of the element w is two or more (YES at S508), the branch point determination processing unit 150e adds the element w to the set R (S509), and moves to S503.

Figure 29:
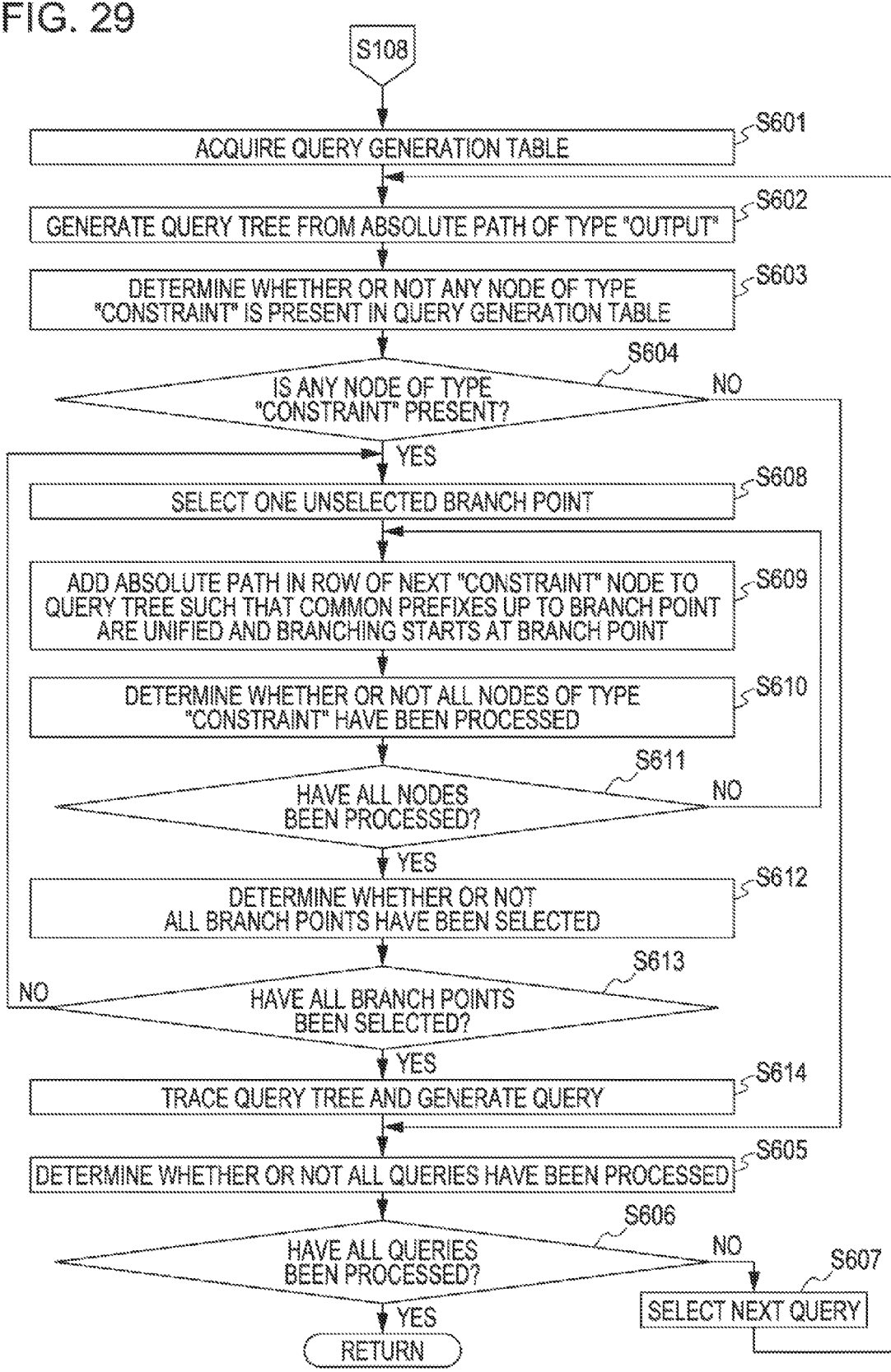
FIG. 29 illustrates a process procedure of a query generation process.

The query generation process illustrated in S108 of FIG. 24 will be described in greater detail with respect to FIG. 29. FIG. 29 is a flowchart illustrating a process procedure of the query generation process. As illustrated in FIG. 29, the query generation processing unit 150f acquires the query generation table 140c (S601), and creates a query tree from the absolute path of the type "OUTPUT" (S602).

The query generation processing unit 150f determines whether or not any node of the type "CONSTRAINT" is present in the query generation table 140c (S603). If any node of the type "CONSTRAINT" is absent (NO at S604), the query generation processing unit 150f determines whether or not all queries have been processed (S605).

If all queries have not been processed (NO at S606), the query generation processing unit 150f selects the next query (S607), and moves to S602. Meanwhile, if all queries have been processed (YES at S606), the query generation processing unit 150f completes the query generation process.

Meanwhile, if any node of the type "CONSTRAINT" is present in the query generation table 140c at S604 (YES at S604), the query generation processing unit 150f selects one unselected branch point (S608). Then, the query generation processing unit 150f adds the absolute path in the row of the next node of the type "CONSTRAINT" to the query tree such that the common prefixes up to the branch point are unified and the branching starts at the branch point (S609).

Then, the query generation processing unit 150f determines whether or not all nodes of the type "CONSTRAINT" have been processed (S610). If all nodes of the type "CONSTRAINT" have not been processed (NO at S611), the query generation processing unit 150f moves to S609.

Meanwhile, if all nodes of the type "CONSTRAINT" have been processed (YES at S611), the query generation processing unit 150f determines whether or not all branch points have been selected (S612). If all branch points have not been selected (NO at S613), the query generation processing unit 150f moves to S608. Meanwhile, if all branch points have been selected (YES at S613), the query generation processing unit 150f traces the query tree to generate a query (S614), and moves to S605.

Figure 30:
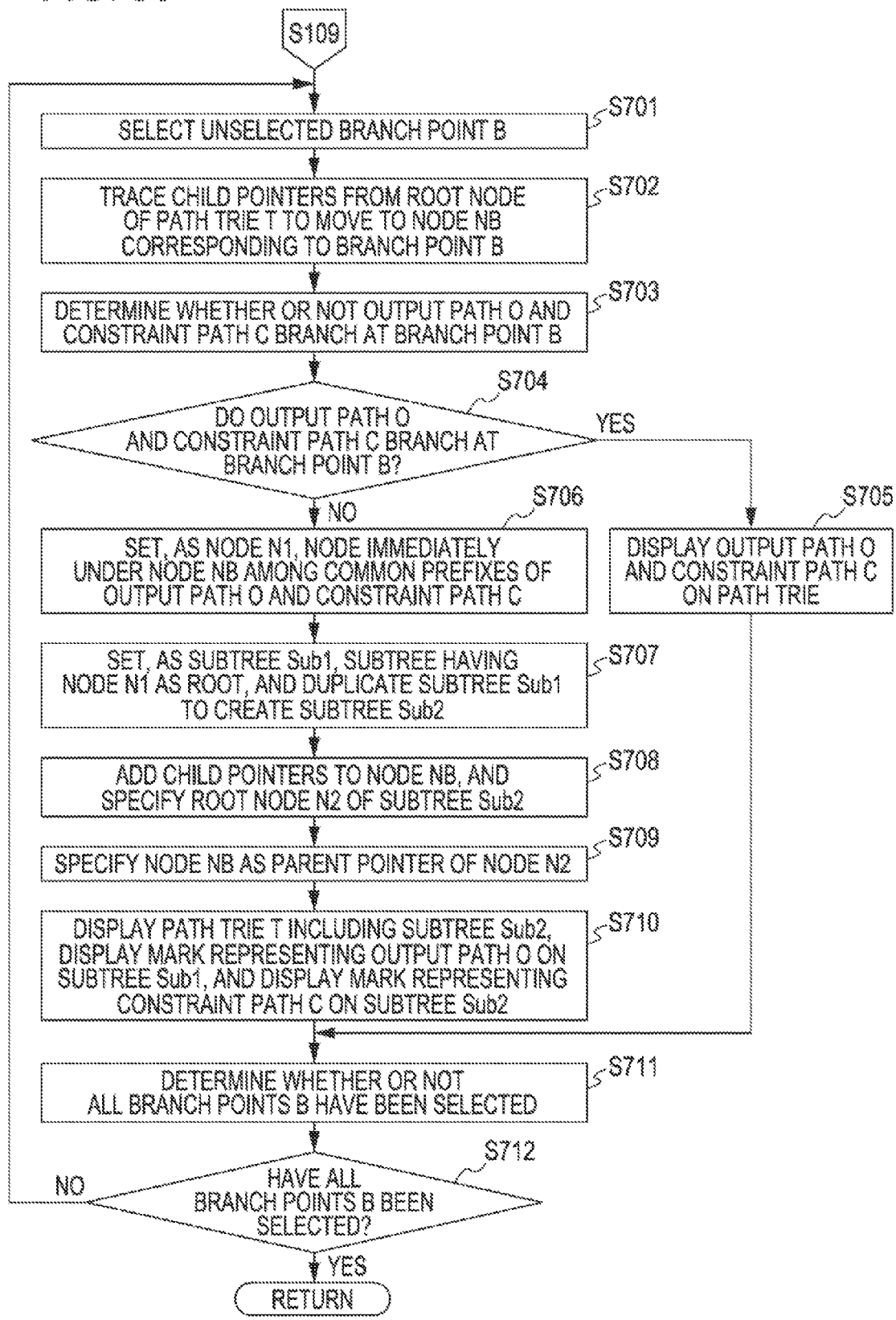
FIG. 30 illustrates a process procedure of a query display process.

The query display process illustrated in S109 of FIG. 24 will be described in greater detail with respect to FIG. 30. FIG. 30 is a flowchart illustrating a process procedure of the query display process. As illustrated in FIG. 30, the query display processing unit 150g selects an unselected branch point B (S701), and traces the child pointers from the root node of the path trie T to move to a node NB corresponding to the branch point B (S702).

The query display processing unit 150g determines whether or not the output path O and the constraint path C branch at the branch point B (S703). If the output path O and the constraint path C branch at the branch point B (YES at S704), the query display processing unit 150g displays the output path O and the constraint path C on the path trie (S705), and moves to S711.

Meanwhile, if the output path O and the constraint path C do not branch at the branch point B (NO at S704), the query display processing unit 150g sets, as a node N1, the node immediately under the node NB among the common prefixes of the output path O and the constraint path C (S706).

Then, the query display processing unit 150g sets, as a subtree Sub1, a subtree having the node N1 as the root node, and duplicates the subtree Sub1 to create a subtree Sub2 (S707). Further, the query display processing unit 150g adds child pointers to the node NB, and specifies a root node N2 of the subtree Sub2 (S708).

The query display processing unit 150g specifies the node NB as the parent pointer of the node N2 (S709). Further, the query display processing unit 150g displays the path trie T including the subtree Sub2, displays the mark representing the output path O on the subtree Sub1, and displays the mark representing the constraint path C on the subtree Sub2 (S710).

Then, the query display processing unit 150g determines whether or not all branch points B have been selected (S711).

If there is an unselected branch point B (NO at 5712), the query display processing unit 150*g* moves to S701. Meanwhile, if all branch points B have been selected (YES at 5712), the query display processing unit 150*g* completes the query display process.

As described above, when the retrieval device 100 according to the present embodiment displays the path trie and receives the specification of the output node and the constraint node, the retrieval device 100 determines the common prefixes from the absolute paths of the respective nodes, and determines the branch point of the query. Further, if a plurality of queries may be generated on the basis of the output node and the constraint node, the retrieval device 100 generates the path trie expanded on the basis of the branch point, and displays the generated path trie to show the user the difference between the queries and allow the user to select the desired and/or optimal query. Accordingly, it is possible to support the creation of a complicated query containing a constraint condition, while maintaining the intuitiveness of the method.

In the present embodiments, description has been made with reference to the XML data as the semi-structured data and the XPath query as the query. However, the semi-structured data type and the query type are not limited thereto. For example, the semi-structured data also includes an RDB (Relational Database) table and CSV (Comma Separated Values) data, as well as the XML data. Therefore, the invention claimed in the present application is also applicable to the RDB table and a CSV file, for example.

Further, in the retrieval device 100 according to the present embodiment, the sibling occurrence number counting unit 150*b* registers the maximum sibling number in the path trie node structure, and the branch point determination processing unit 150*e* refers to the maximum sibling number to determine whether or not the corresponding node corresponds to the branch point. However, the configuration is not limited thereto.

For example, if the corresponding node has two or more siblings, the sibling occurrence number counting unit 150*b* may register, in the path trie node structure, only identification information indicating the presence of two or more siblings. In this case, in the determination of the branch point, the branch point determination processing unit 150*e* can determine the branch point to be the node having the identification information among the branch point candidates.

In the processes described in the present embodiments, all or part of the processes described to be automatically performed can also be manually performed. Alternatively, all or part of the processes described to be manually performed can also be automatically performed. In addition, the process procedures, the control procedures, the specific names, and the information including various data and parameters described in the above text and drawings can be arbitrarily modified, unless otherwise specified.

Further, the constituent components of the devices illustrated in the drawings are not always required to be physically configured as illustrated in the drawings. That is, specific forms of distribution and integration of the devices are not limited to those illustrated in the drawings. Therefore, all or part of the devices can be configured to be functionally or physically distributed or integrated in arbitrary units in accordance with various loads, the usage state, and so forth. Further, all or part of the processing functions performed by the devices may be realized by a CPU and a program analyzed and executed by the CPU, or may be realized by hardware based on wired logic, for example.

Figure 31:
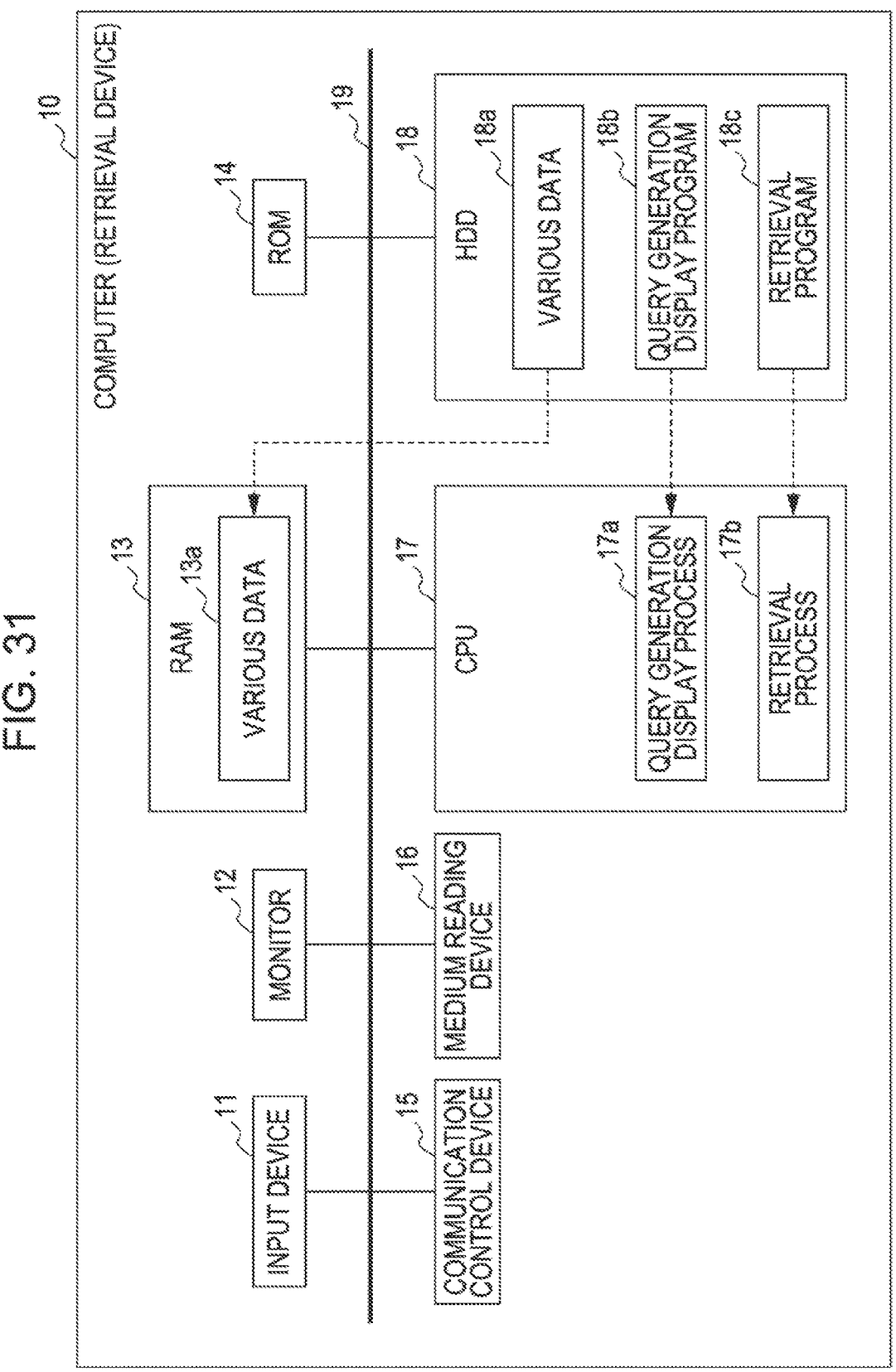
FIG. 31 illustrates a hardware configuration of the retrieval device.

FIG. 31 is a diagram illustrating a hardware configuration of a computer corresponding to the retrieval device 100 described in the embodiments. As illustrated in FIG. 31, in the computer (retrieval device) 10, an input device 11, a monitor 12, a RAM (Random Access Memory) 13, a ROM (Read Only Memory) 14, a communication control device 15 for performing data communication with another device via a network, a medium reading device 16, a CPU (Central Processing Unit) 17, and an HDD (Hard Disk Drive) 18 are connected by a bus 19.

For example, the HDD 18 stores a query generation display program 18*b* and a retrieval program 18*c*, which exert functions similar to the functions of the above-described retrieval device 100. As the CPU 17 reads and executes the query generation display program 18*b* and the retrieval program 18*c*, a query generation display process 17*a* and a retrieval process 17*b* are activated.

Herein, the query generation display process 17*a* corresponds to the path trie generation unit 150*a*, the sibling occurrence number counting unit 150*b*, the data structure display unit 150*c*, the query specification reception unit 150*d*, the branch point determination processing unit 150*e*, the query generation processing unit 150*f*, and the query display processing unit 150*g* illustrated in FIG. 13. Further, the retrieval process 17*b* corresponds to the retrieval processing unit 150*h* illustrated in FIG. 13.

The HDD 18 stores various data 18*a* corresponding to the data stored in the storage unit 140 illustrated in FIG. 13. The CPU 17 reads, into the RAM 13, the various data 18*a* stored in the HDD 18, and performs the process of displaying the query and the process of retrieving data from the XML data by using various data 13*a*.

All examples and conditional language recited herein are intended for pedagogical objects to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A retrieval device which retrieves information from semi-structured data formed by item elements and value elements, the retrieval device comprising:
   a processor, the processor configured to:
      create aggregate structure information from the semi-structured data by aggregating a plurality of child item elements into one representative child item element, the plurality of child item elements that are aggregated share a same name and are directly connected to parent item elements sharing a same name;
      receive a retrieval request with an output condition and a constraint condition specified on the aggregate structure information;
      compute branch point candidates based on a result of a check of the output condition and the constraint condition;
      determine a branch point from the branch point candidates;
      check for the branch point at common item elements associated with each of the output condition and the constraint condition in the aggregate structure information to determine whether a plurality of queries are created according to the retrieval request; and re-aggregate the aggregate structure information based on the determined branch point and outputs, to a display device, re-aggregate structure information corresponding to the plurality of queries, the re-aggregate structure information showing the branch point which is not expressed in the aggregate structure information.

2. The retrieval device according to claim 1, wherein, the processor recognizes a lowest item element, among the common item elements, as the branch point.

3. The retrieval device according to claim 1, wherein, the processor recognizes, as the branch point, an item element, among the common item elements, which has the plurality of child item elements sharing the same name in the semi-structured data.

4. The retrieval device according to claim 1, the processor further configured to:
record identification information, the identification information indicating that there are the plurality of child item elements sharing the same name and being directly connected to a parent item element in the semi-structured data, or indicating a number of the plurality of child item elements,
and wherein,
the processor determines whether the plurality of queries are created by reference to the identification information.

5. A retrieval method performed by a retrieval device which retrieves from semi-structured data formed by item elements and value elements, the retrieval method comprising:
creating aggregate structure information from the semi-structured data by aggregating a plurality of child item elements into one representative child item element, the plurality of child item elements that are aggregated share a same name and are directly connected to parent item elements sharing a same name;
receiving a retrieval request with an output condition and a constraint condition specified on the aggregate structure information;
computing branch point candidates based on a result of a check of the output condition and the constraint condition;
determining a branch point from the branch point candidates;
determining whether a plurality of queries are created according to the retrieval request by checking the branch point at common item elements associated with each of the output condition and the constraint condition in the aggregate structure information;
re-aggregating the aggregate structure information based on the determined branch point; and
outputting the re-aggregate structure information to a display device, the re-aggregate structure information corresponding to the plurality of queries and showing the branch point which is not expressed in the aggregate structure information.

6. The retrieval method according to claim 5, wherein, said determining recognizes a lowest item element, among the common item elements, as the branch point.

7. The retrieval method according to claim 5, wherein, said determining recognizes, as the branch point, an item element, among the common item elements, which has the plurality of child item elements sharing the same name in the semi-structured data.

8. The retrieval method according to claim 5, further comprising:
recording identification information, the identification information indicating that there are the plurality of child item elements sharing the same name and being directly connected to a specific parent item element in the semi-structured data, or indicating a number of the child item elements,
and wherein,
said determining determines whether the plurality of queries are created by reference to the identification information.

9. A computer-readable storage medium storing a program to be executed by a computer to perform a retrieving process from semi-structured data formed by item elements and value elements, execution of the program by computer causes the computer to perform the retrieving process comprising:
creating aggregate structure information from the semi-structured data by aggregating a plurality of child item elements into one representative child item element, the plurality of child item elements that are aggregated share a same name and are directly connected to parent item elements sharing a same name;
receiving a retrieval request with an output condition and a constraint condition specified on the aggregate structure information;
computing branch point candidates based on a result of a check of the output condition and the constraint condition;
determining a branch point from the branch point candidates;
determining whether a plurality of queries are created according to the retrieval request by checking the branch point at common item elements associated with each of the output condition and the constraint condition in the aggregate structure information;
re-aggregating the aggregate structure information based on the determined branch point; and
outputting the re-aggregate structure information to a display device, the re-aggregate structure information corresponding to the plurality of queries and showing the branch point which is not expressed in the aggregate structure information.

10. The storage medium according to claim 9, wherein, said determining recognizes a lowest item element, among the common item elements, as the branch point.

11. The storage medium according to claim 9, wherein, said determining recognizes, as the branch point, an item element, among the common item elements, which has the plurality of child item elements sharing the same name in the semi-structured data.

12. The storage medium according to claim 9, the process further comprising:
recording identification information, the identification information indicating that there are the plurality of child item elements sharing the same name and being directly connected to a specific parent item element in the semi-structured data, or indicating a number of the child item elements,
and wherein
said determining determines whether the plurality of query are created by reference to the identification information.

13. A retrieval method performed by a retrieval device which retrieves from semi-structured data formed by item elements and value elements, the retrieval method comprising:
creating aggregate structure information from the semi-structured data by aggregating a plurality of child item elements into one representative child item element, the plurality of child item elements that are aggregated share a same name and are directly connected to parent item elements sharing a same name;

receiving a retrieval request with an output condition and a constraint condition specified on the aggregate structure information;

computing branch point candidates based on a result of a check of the output condition and the constraint condition;

determining a branch point from the branch point candidates;

determining whether a plurality of queries correspond to the retrieval request by checking the branch point;

re-aggregating the aggregate structure information to illustrate that each of the plurality of queries correspond to the retrieval request; and outputting the re-aggregate structure information to a display device for selection of one of the plurality of queries.

* * * * *

UNITED STATES PATENT AND TRADEMARK OFFICE
CERTIFICATE OF CORRECTION

| | | |
|---|---|---|
| PATENT NO. | : 8,412,737 B2 | |
| APPLICATION NO. | : 12/720656 | |
| DATED | : April 2, 2013 | |
| INVENTOR(S) | : Tatsuya Asai et al. | |

It is certified that error appears in the above-identified patent and that said Letters Patent is hereby corrected as shown below:

On the Title Page, Item (54) and in the specifications, column 1, lines 1-3, the title should read:

-- SEMI-STRUCTURED DATA RETRIEVAL METHOD, AND STRUCTURED DATA RETRIEVAL DEVICE --

Signed and Sealed this
Twenty-eighth Day of May, 2013

Teresa Stanek Rea
*Acting Director of the United States Patent and Trademark Office*